United States Patent
Horstman, III

(10) Patent No.: US 11,325,041 B2
(45) Date of Patent: May 10, 2022

(54) CODELESS VIDEO GAME CREATION PLATFORM

(71) Applicant: Martin Thomas Horstman, III, White Plains, NY (US)

(72) Inventor: Martin Thomas Horstman, III, White Plains, NY (US)

(*) Notice: Subject to any disclaimer, the term of this patent is extended or adjusted under 35 U.S.C. 154(b) by 0 days.

(21) Appl. No.: 17/026,599

(22) Filed: Sep. 21, 2020

(65) Prior Publication Data

US 2021/0086081 A1 Mar. 25, 2021

Related U.S. Application Data

(60) Provisional application No. 62/903,668, filed on Sep. 20, 2019, provisional application No. 62/903,676, filed on Sep. 20, 2019.

(51) Int. Cl.
*A63F 13/63* (2014.01)
*A63F 13/53* (2014.01)

(52) U.S. Cl.
CPC .............. *A63F 13/63* (2014.09); *A63F 13/53* (2014.09)

(58) Field of Classification Search
CPC ........... A63F 13/53; A63F 13/60; A63F 13/63
See application file for complete search history.

(56) References Cited

U.S. PATENT DOCUMENTS

| | | | | |
|---|---|---|---|---|
| 6,061,532 A | * | 5/2000 | Bell | A63F 13/00 345/629 |
| 6,130,677 A | * | 10/2000 | Kunz | G06F 3/011 345/630 |
| 7,597,622 B2 | * | 10/2009 | Takase | A63F 13/10 463/33 |
| 8,570,320 B2 | * | 10/2013 | Izadi | G06F 3/011 345/420 |
| 2004/0130734 A1 | | 7/2004 | Wozniak et al. | |
| 2008/0013110 A1 | | 1/2008 | Wozniak et al. | |
| 2014/0365993 A1 | | 12/2014 | Rath et al. | |
| 2015/0128104 A1 | | 5/2015 | Rath et al. | |
| 2017/0209794 A1 | | 7/2017 | Rath et al. | |
| 2017/0266558 A1 | | 9/2017 | Rath et al. | |
| 2019/0054378 A1 | | 2/2019 | Rath et al. | |

* cited by examiner

*Primary Examiner* — James S. McClellan
(74) *Attorney, Agent, or Firm* — Ostrolenk Faber LLP

(57) ABSTRACT

A codeless video game method may include receiving an arbitrary game image previously unknown to the computer system and containing object images, each object image corresponding to a game element of the video game, each game element associated with at least one property, and associating automatically each object image with a respective game element that corresponds thereto by identifying automatically, in the game image, each object image. Then a program of instructions is generated that is executable by the computer system, which defines behavior of game elements in the video game according to the at least one property associated with the game elements. During a playing of the video game, the program of instructions causes each game element to be represented in the display by the object image, which may be substantially identical to the game object images that were input as part of the overall game image.

17 Claims, 28 Drawing Sheets

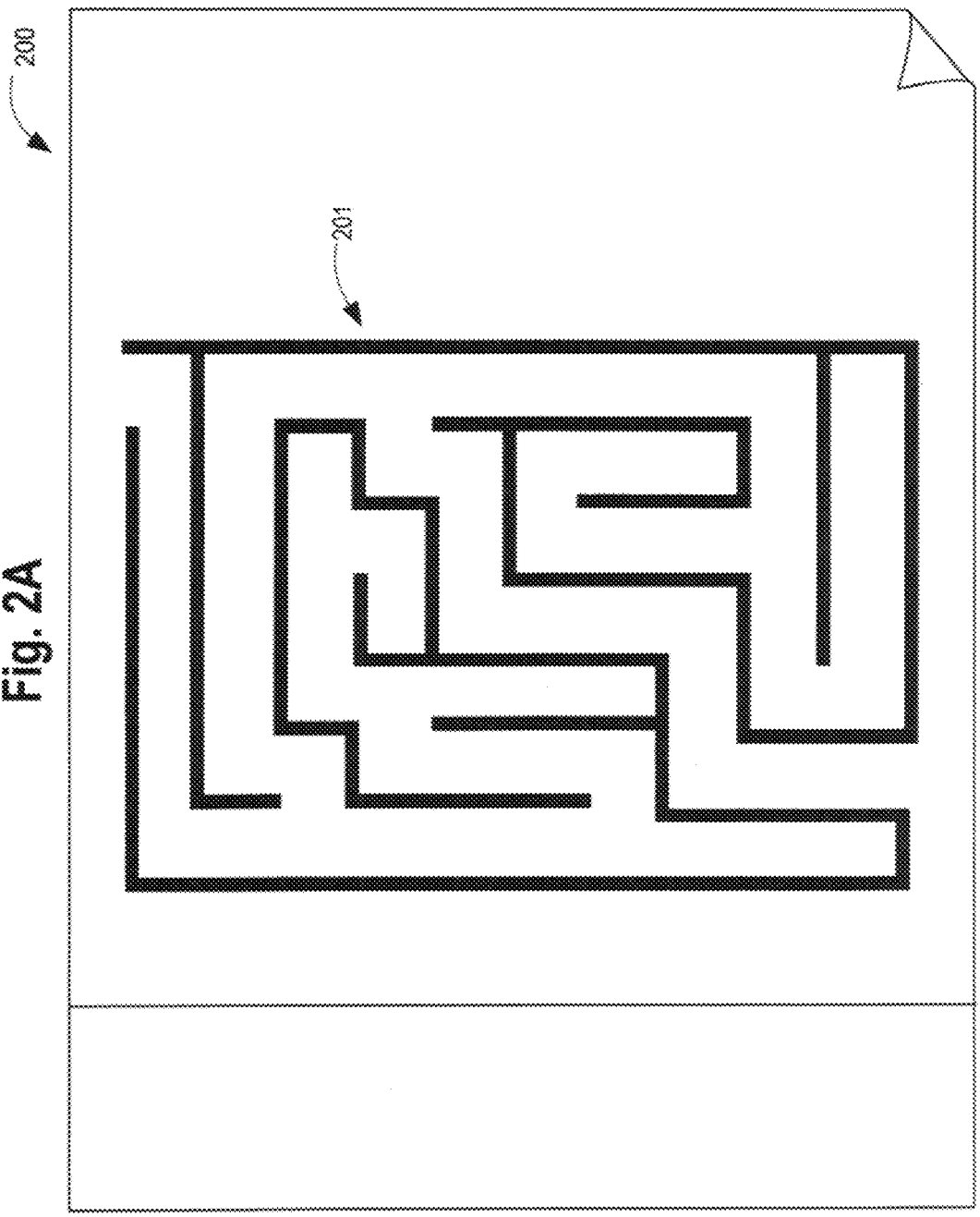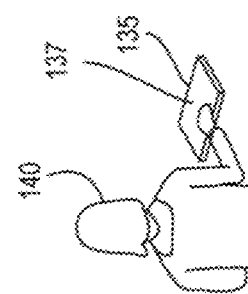

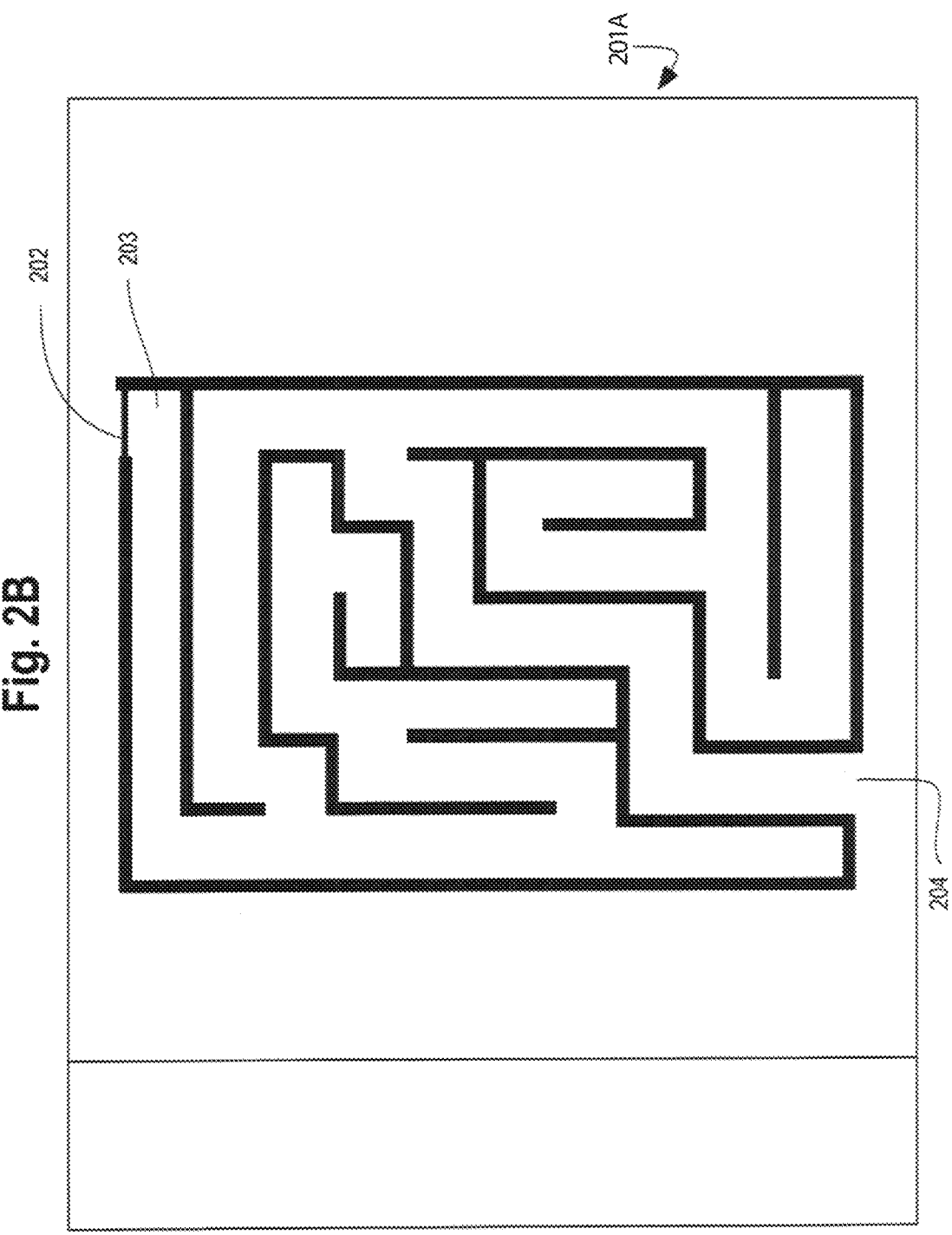

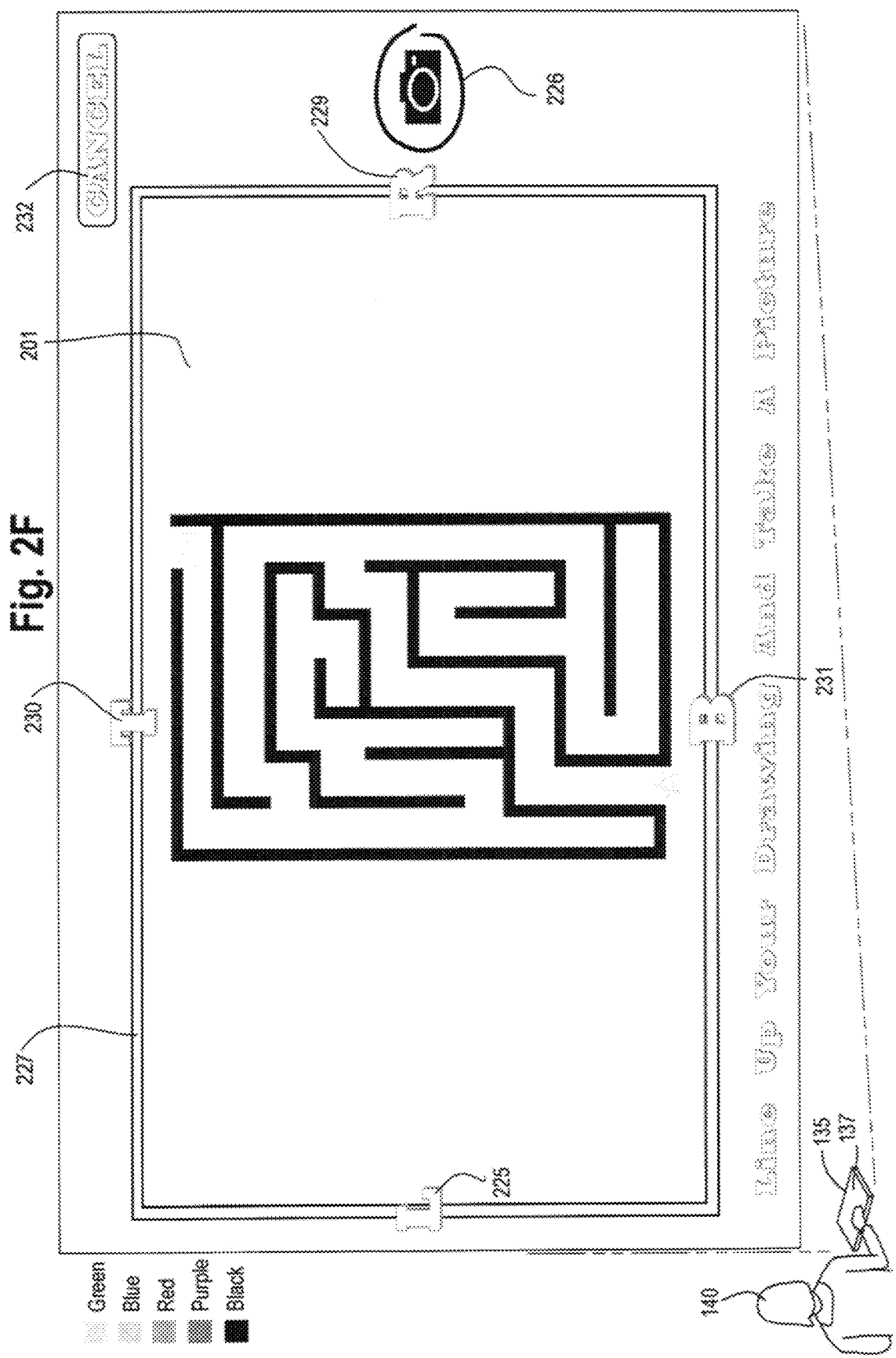

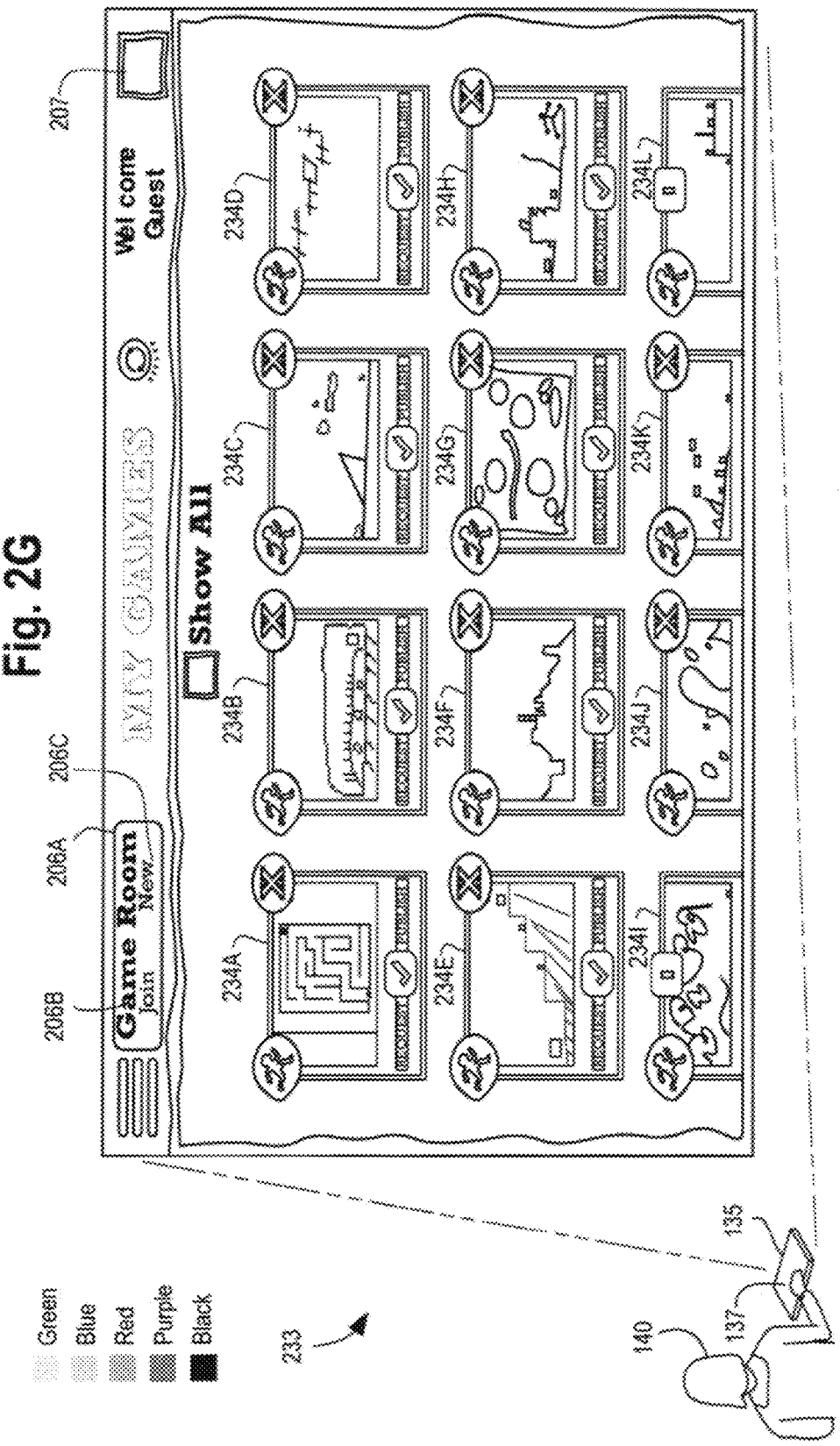

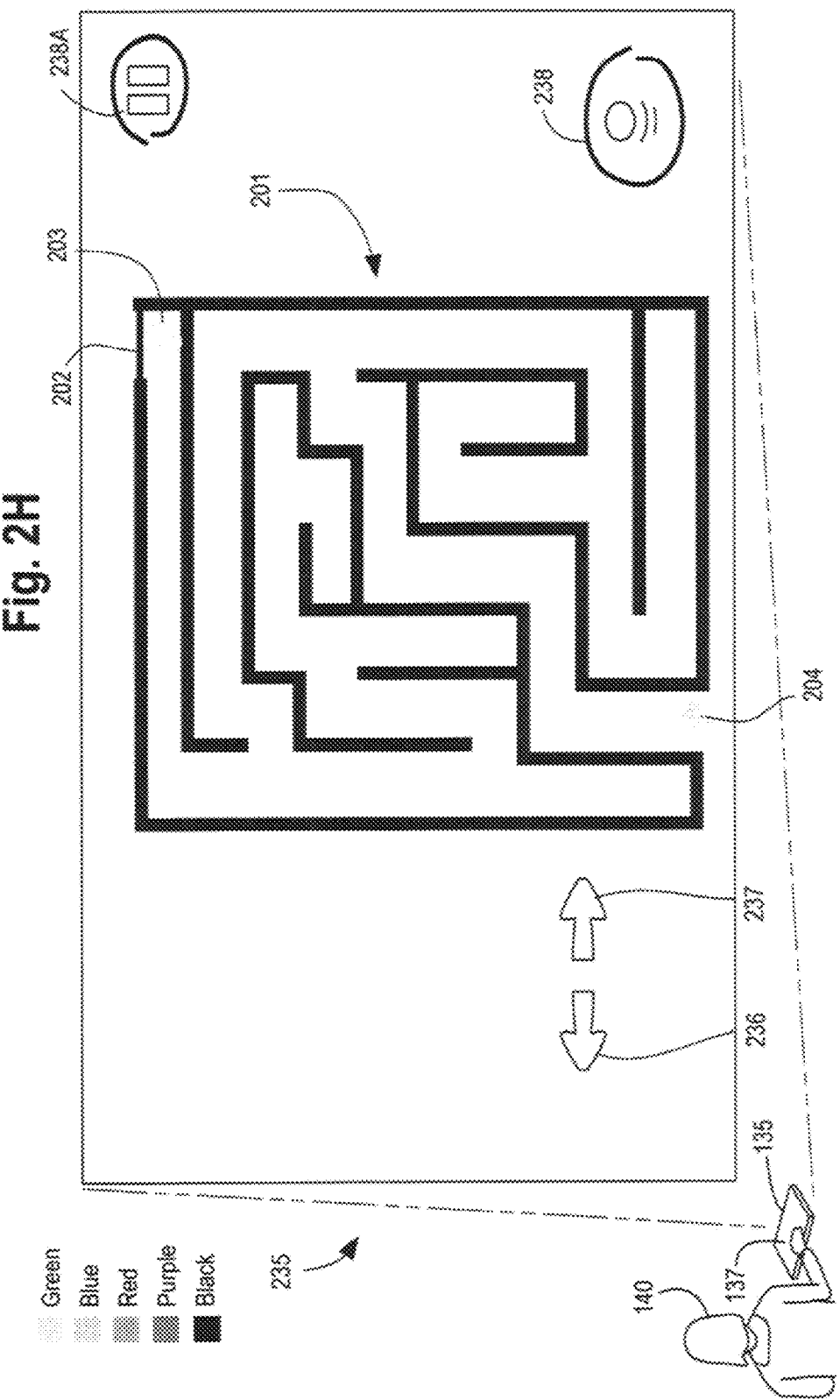

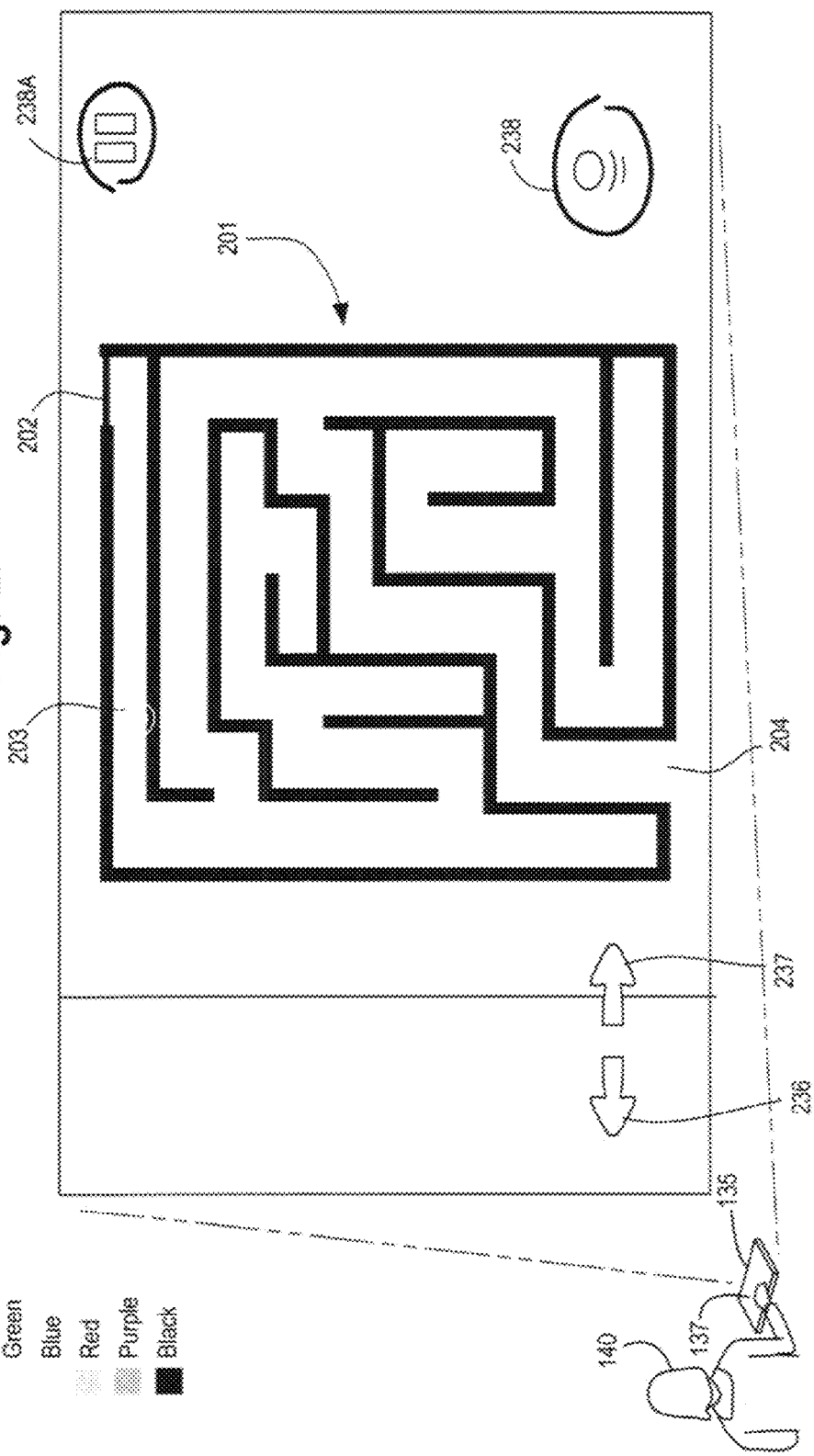

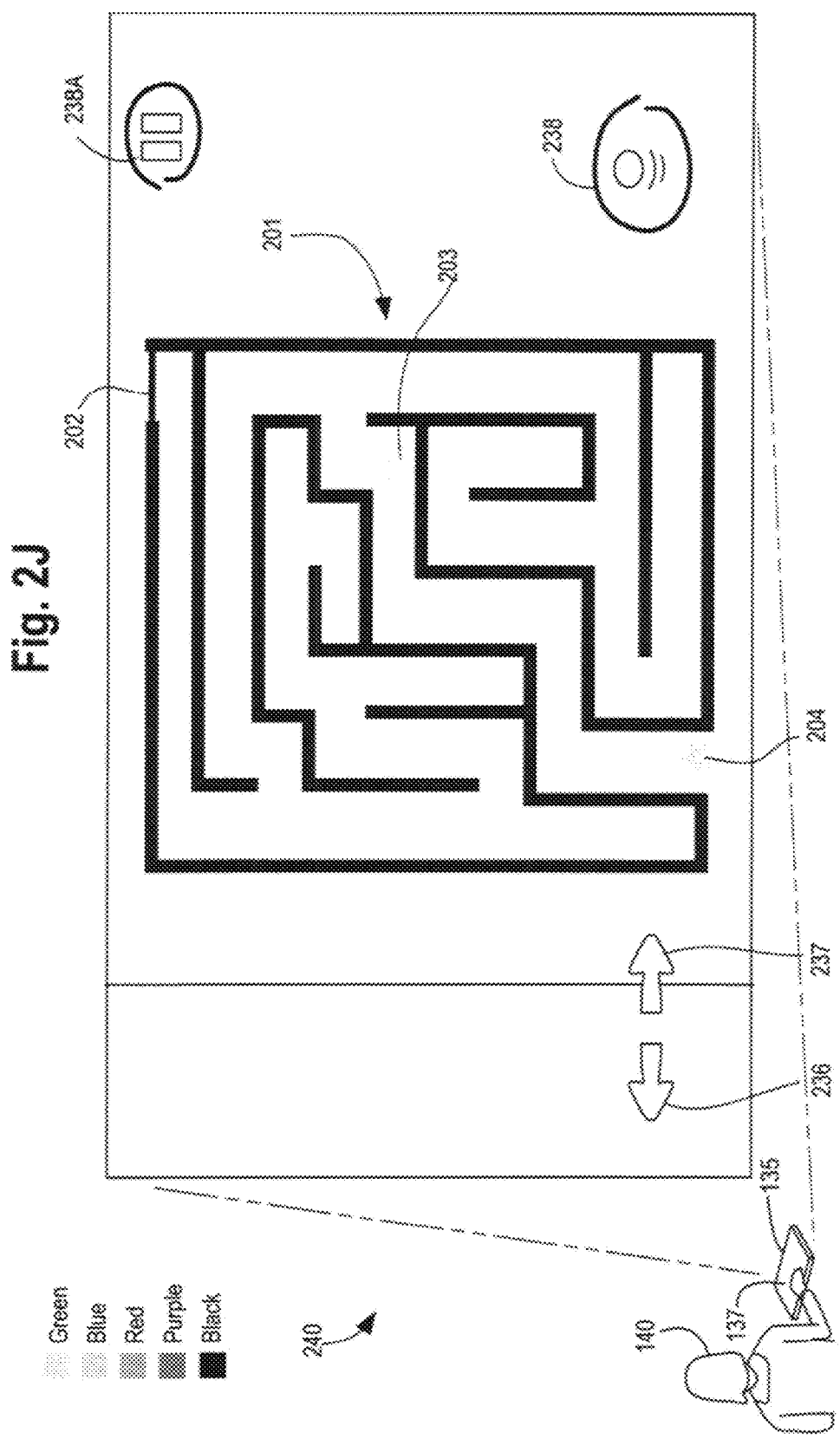

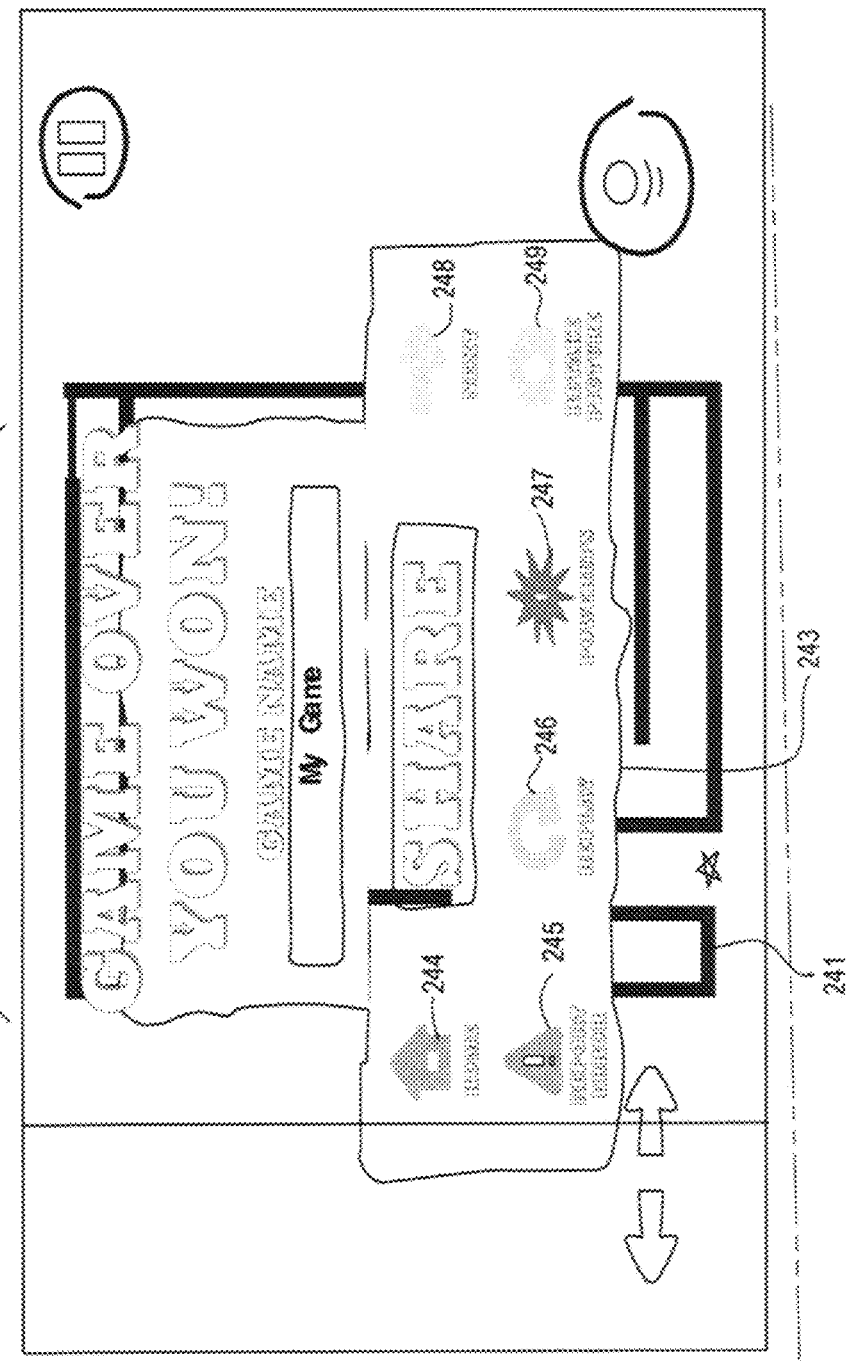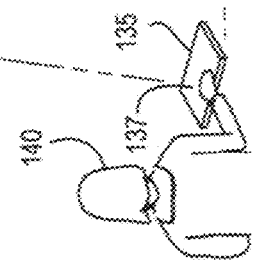

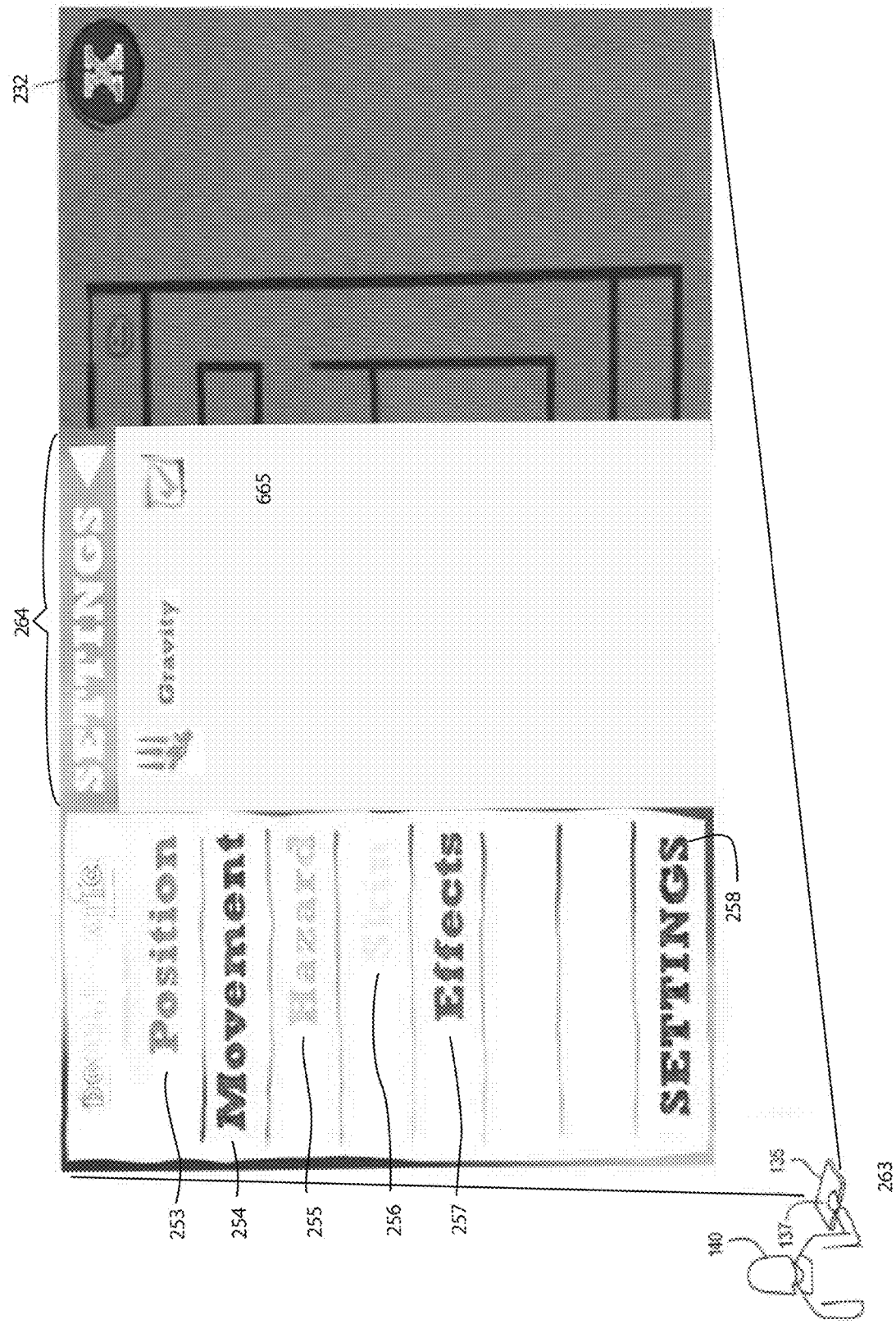

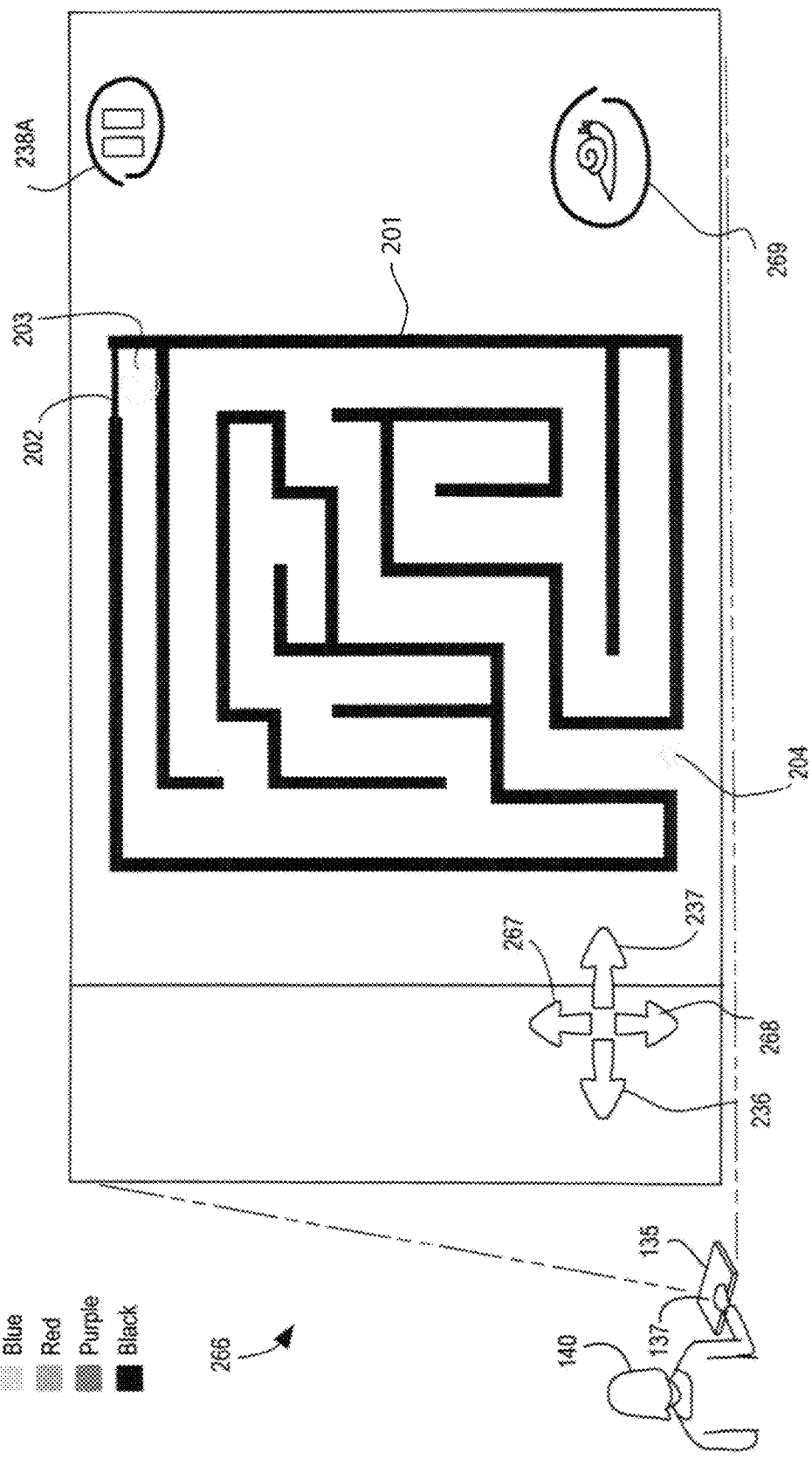

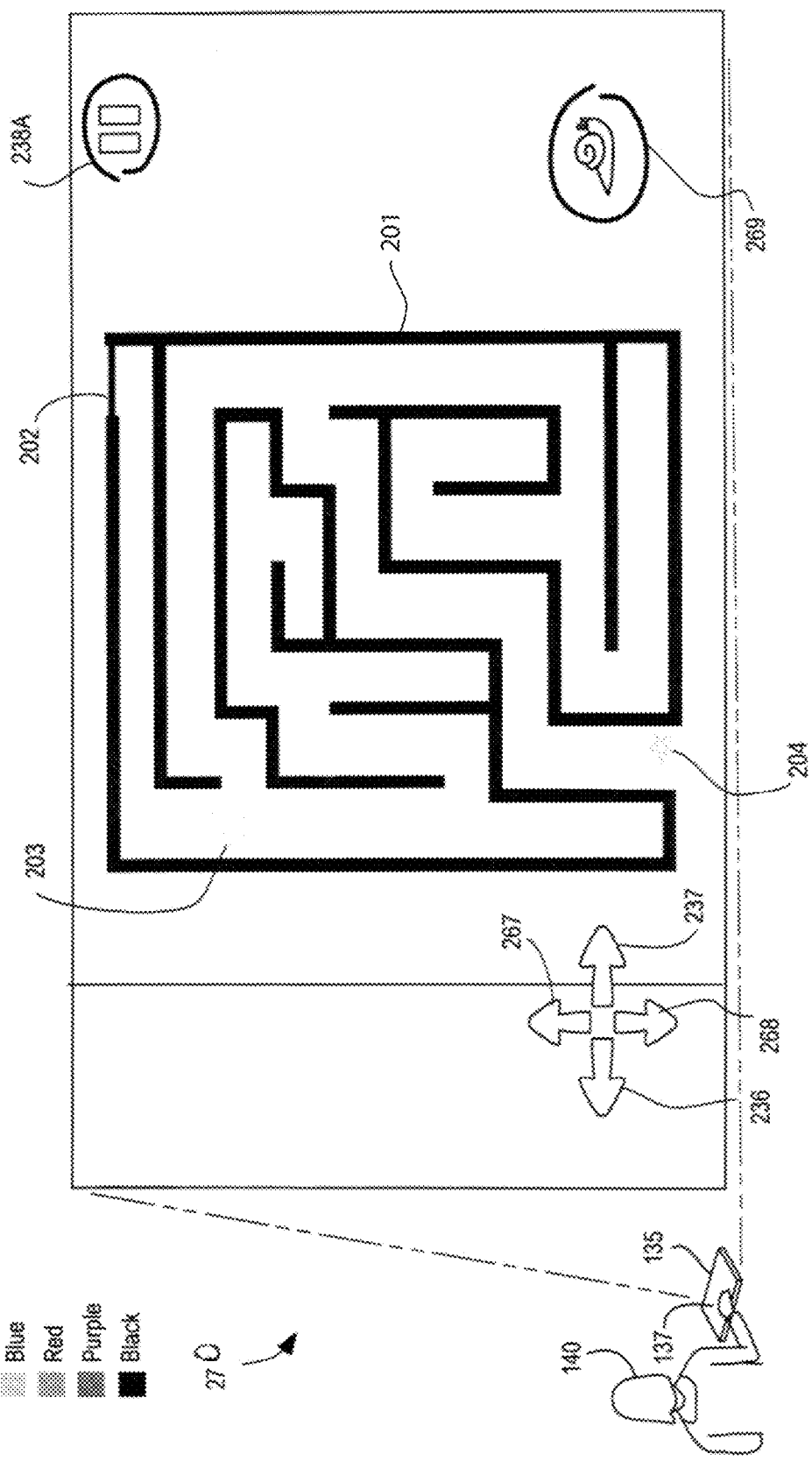

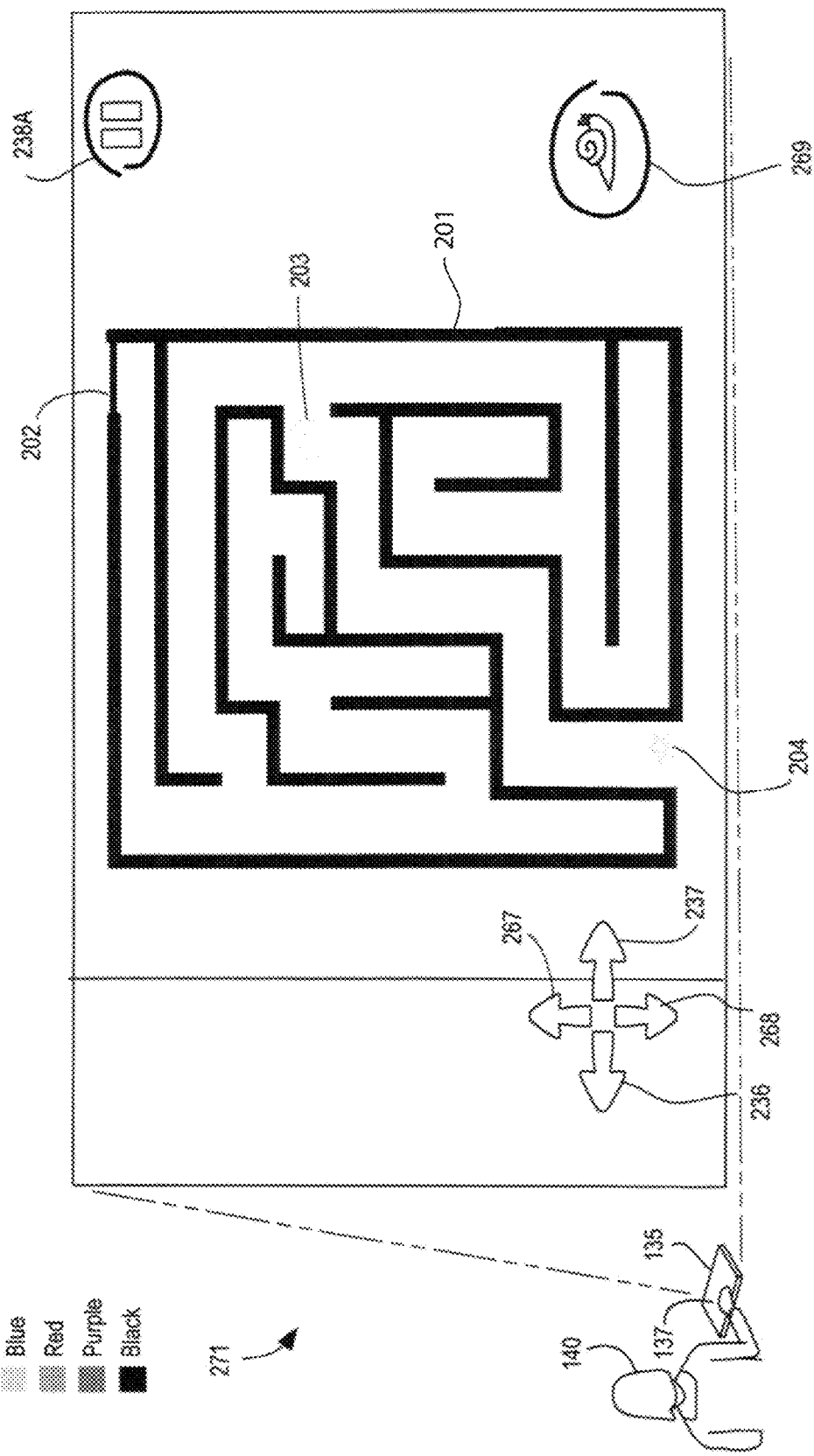

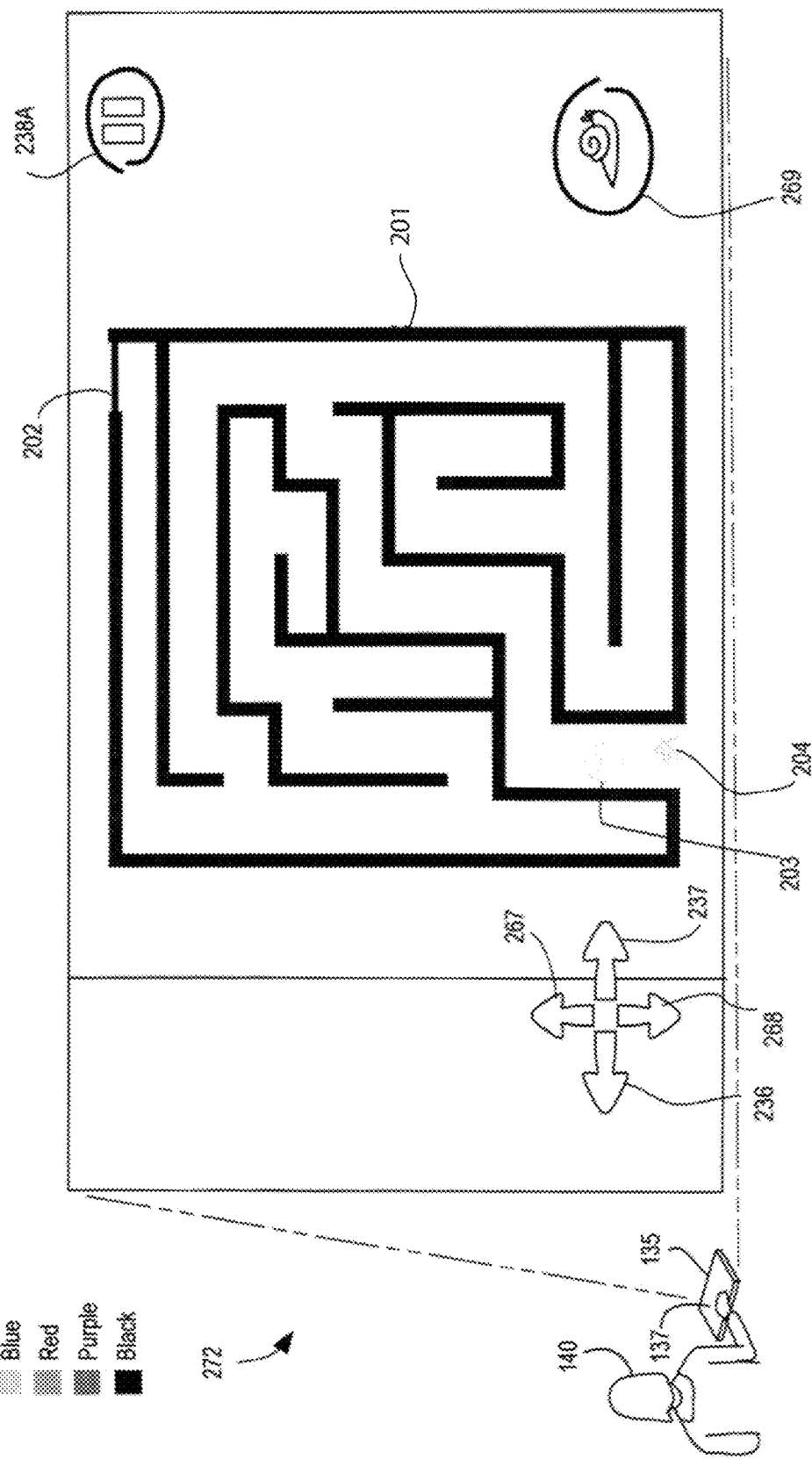

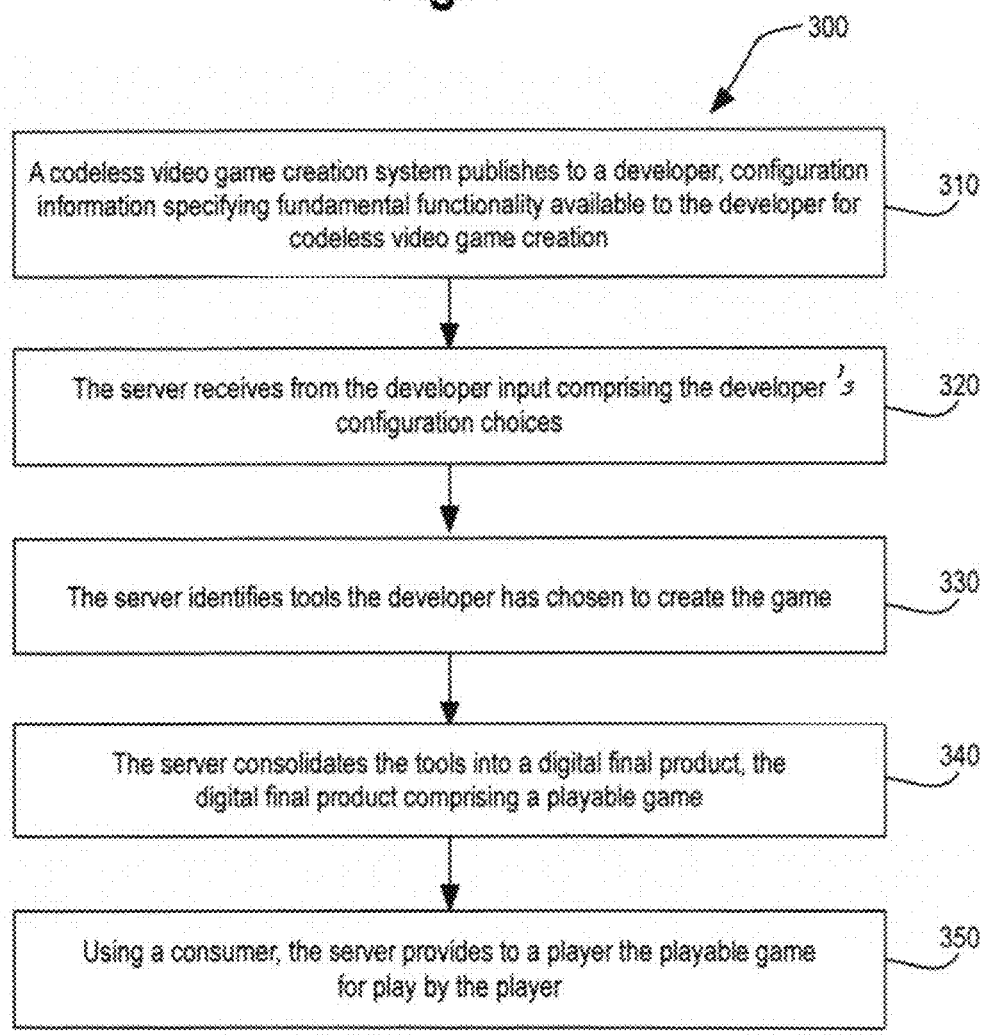

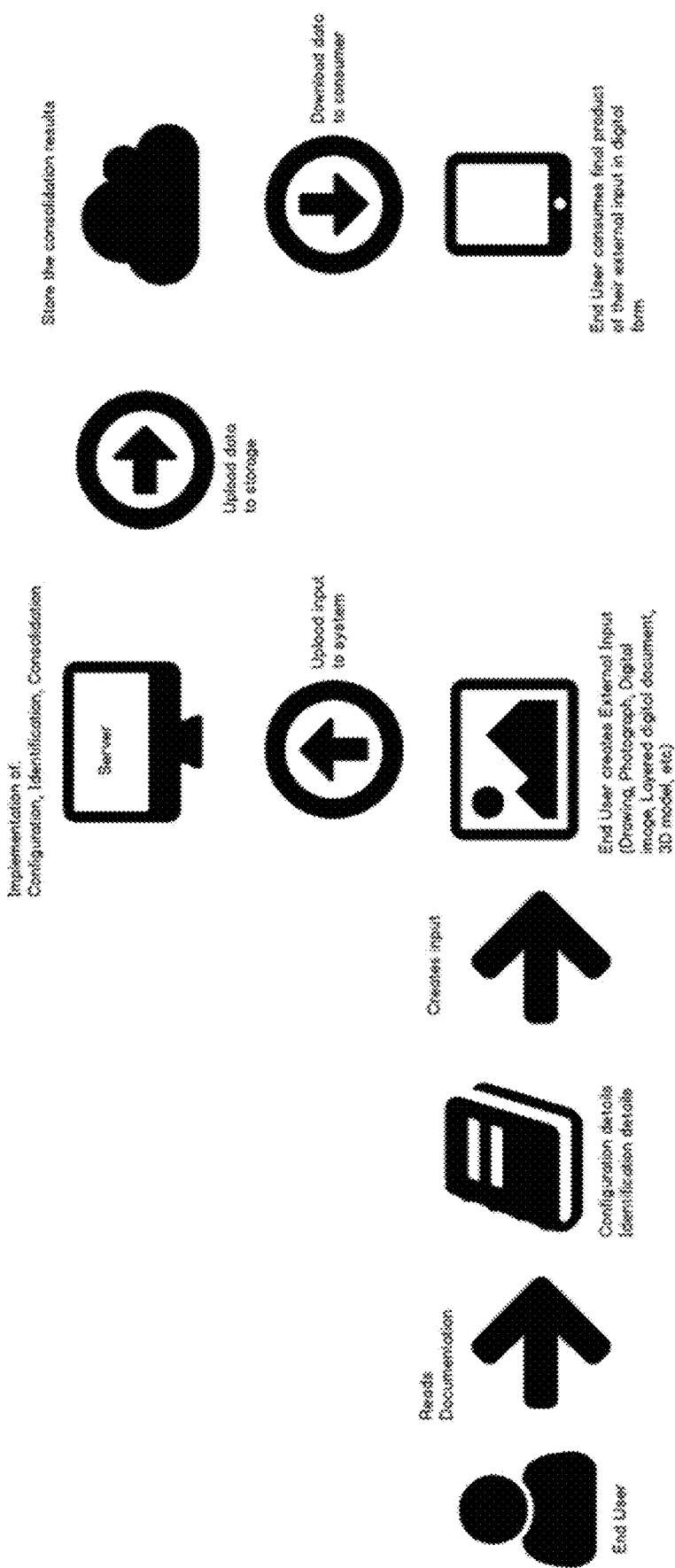

Figure 02 – Super Type

Fig. 8

Figure 03 – destroy on click

```
{
    "Type": "Destroy On Click",
    "Components": [
        {
            "Type": "Behavior",
            "Name": "Clickable"
        },
        {
            "Type": "Trigger",
            "Name": "OnClick",
            "Values": {
                "NumClicks": 1,
                "EventName": "onClick"
            }
        },
        {
            "Type": "Action",
            "Name": "Destroy",
            "Values": {
                "EventName": "onClick"
            }
        }
    ]
}
```

CODELESS VIDEO GAME CREATION PLATFORM

CROSS-REFERENCE TO RELATED APPLICATIONS

The present non-provisional application for utility patent claims priority to U.S. Provisional Patent Application Nos. 62/903,668 and 62/903,676, both filed Sep. 20, 2019, which have the same inventor as the present application. The contents of each of these provisional patent applications are incorporated in full herein by reference.

BACKGROUND

Video games are very popular and all over the world, and especially with children and young people. Educators, and parents, however, wish to have their children spend time on activities that encourage intellectual growth and artistic projects.

Software that enables users to have a role in the creation of a video game has been developed, including applications that enable a user to participate in the creation of a video game by writing software code is known. For example, Game Engine, also known as Game Architecture, Game Framework, or Fame Frame, it is a software development environment that allows people to build video games. It may be used to construct games for various electronica device platforms, and the software provides a game engine that includes a rendering engine that provides graphics, a physics engine or collision detection/response, audio, scripting, animation, networking, memory management, a scene graph, and the like.

Also known is RPG Maker is a software program that allows a user to create his/her own role-playing video game and includes a tile set based map editor and a simple scripting language for coding events.

Game Salad is a tool that includes a visual editor and behavior-based logic game that teaches concepts in computer science and problem-solving. Game Salad has a preview mode for debugging and testing the performance of the functionality of games.

Many users, including children, would prefer to be able to participate in the creation of a video game in a streamlined fashion without having to write specialized software or any computer code. Codeless less video game development is known. Buildbox is a development tool that allows the user to change aspects of a video game by creating the skeleton of the game, changing or editing a character from character settings, edit or change environmental settings, such as the "gravity" or "friction" that is seen in the game by avatars, create multiple world levels, change the reward system, change user face options, create a banner, and the like, all without coding.

With Pixel Press Floors users may draw levels of arcade games on graph paper using special symbols. A user takes a picture of his or her drawing and uploads it, and the app processes the picture and creates a video game.

Bloxels, also developed by Pixel Press, uses a physical board with a 13×13 grid to create a video game. Users place color blocks, each block representing a known object in the game on a game board provided by the system and then capture a photograph, which the application uses to create a playable level of a game. Games may be further enhanced by creating animated characters and villains within the game. Also known are the following patents applications: 20190054378 SYSTEMS AND METHODS FOR CREATING A PLAYABLE VIDEO GAME FROM A THREE-DIMENSIONAL MODEL; 20170266558 SMART VIDEO GAME BOARD SYSTEM AND METHOD; 20170209794 Systems and Methods for Creating a Playable Video Game From A Three-Dimensional Model; 20150128104 Systems and Methods for Creating a Playable Video Game From A Three-Dimensional Model; 20140365993 Systems and Methods for Creating a Playable Video Game From A Static Model; 20080013110 IMAGE FILE BIT DEPTH EXPANSION AND SUBSEQUENT MANIPULATION; and 20040130734 Image file bit depth expansion and subsequent manipulation.

However, it would be desirable to have a codeless video game development system that enables a user to design a video game, including visual elements of the avatar and other characters, the obstacles, mazes or other visual elements that constrain movement by sprites, avatars and characters, as well as the non-functional visual elements of the video game.

SUMMARY

A codeless video game development system is described in which a user may draw on a piece of paper or on a photograph or on another arbitrary image previously unknown to the computer system, such that the drawing incorporates some visual cues known in advance by the system, and the system creates program code for running the video game automatically based on the image designed by the user. The virtual board or video game background would be substantially identical to the image that the user inputted.

Such software may empower users to have an active role in game development and may encourage curiosity, intellectual growth, and creativity and may improve coding skills. In addition, it also may encourage artistic exploration and confidence since the way game objects on the input game image and the image background are drawn and may affect the operation of the video game, including the manner in which game objects move and otherwise behave during the playing of the video game.

A method for codeless video game creation, non-transient computer-readable code for providing the method, means for providing the method, and a system that enables a user to create a video game in a codeless fashion, are described herein. Such a method may include: publishing to a developer, by a codeless video game creation server, configuration information specifying fundamental functionality available to the developer for codeless video game creation; receiving from the developer, by the server, input comprising the developer's configuration choices; identifying, by the server, tools the developer has chosen to create the game; consolidating, by the server, the tools into a digital final product, the digital final product comprising a playable game; and providing, by the server, using a consumer, to a player, the playable game for play by the player.

Such a codeless video game platform may include: a game creation server; a network operably connected to the server; a developer interface operably connected to the game creation server via the network, the game creation server configured to receive from a developer game creation input configured to create a game; an external device operably connected to the game creation server via the network, the external device usable by a player to play the game, the external device further configured to communicate with the server using the network, the external device further configured to receive input from the player as the player plays the game, the external device further configured to upload the input to the server via the network; and storage configured to store data, the storage operably connected to the server over the network.

According to an aspect of the invention provided is a method of creating a video game by a computer system based on a game image input by a user. Such a method may include:

receiving, by a user interface of the computer system, the game image, the game image previously unknown to the computer system and containing a plurality of object images, each object image corresponding to a game element of the video game, each game element associated with at least one property;

associating automatically each object image with a respective game element that corresponds thereto by identifying automatically, in the game image, each object image;

generating automatically a program of instructions executable by the computer system, the program of instructions defining positioning of game elements in the video game according to the at least one property associated with the game elements; and executing the program of instructions to generate a display of a video game playable by the user, wherein during a playing of the video game, the program of instructions causes each game element to be represented in the display by the object image.

Such a method may further include: prompting the user to enter a game configuration for the video game before the generating of the program of instructions, wherein the game configuration comprises a game object during a playing of the video game.

Such a method may further include:

providing automatically, by the user interface, a plurality of predefined game configurations; and receiving, as the entry of the game configuration by the user, a selection of the user from among the predefined game configurations.

Such a method may also include:

before the associating, receiving from the user, via the user interface, a customization of the at least one property; and the associating comprises associating the game element with the at least one customized property, wherein the program of instructions is generated according to the customized at least one property.

In such a method, at least one of the game elements may comprise an avatar configured to be controlled by the user during the playing of the video game.

Also, at least one of game elements may be an obstacle configured to be movable by the computer system during a playing of the video game in response to an input of the user during the playing of the video game that controls a first game element.

For example, a first object image of the plurality of object images may include a color; and then the associating may entail associating the first object image with a respective game element according to the color.

Similarly, the object image of the plurality of object images may entail a shape; and then the associating would entail associating the first object image with a respective game element according to the shape.

By way of further example, the at least one property of the game element may be an attribute that controls a behavior of the game element during the playing of the video game.

Such a method may also include: receiving from the user a game configuration for the video game before the generating of the program of instructions, wherein the game configuration corresponds to a game objective during a playing of the video game, and the at least one property of the game element comprises an attribute that controls a behavior of the game element during a playing of the video game, such that the behavior automatically controls the game element during the playing of the video game according to the game objective.

Such a method may also include: controlling the positioning of a first game element of the plurality of game elements in the video game based on input received from the user during the playing of the video game, and then the generating of the program of instructions would include generating instruction defining a behavior during the playing of the video game of a second game element of the plurality of game elements, wherein the behavior is based on the positioning of the first game element. For example, the identifying may also entail identifying a position of a color segment in the image; and the generating of the program of instructions comprises instructions positioning the game elements bound by the position identified, and then during the playing of the video game the computer system would cause display of the color segment at the position identified.

Such a method may also include, before the receiving, reporting to the user the plurality of object images and the game elements they represent, wherein the game elements are stored by the computer system prior to the reporting.

Such a method may also include: displaying, during the playing of the game, an output game image provided as a virtual game board with the object images moved on the output game image, and the output game image would be substantially identical to the game image input by the user. In addition, in such an implementation of the method, the method may comprise, before the displaying of the output game image, performing image background processing on the game image input by the user.

During the playing of the video game according to such a method, a size of a first object image of the plurality of object images in relation to the size of the output game image may be substantially unchanged in comparison with the size of the first object image in relation to the size of the game image input by the user.

Also, unlike some other video game generators known in the prior art, the game image input by the user may be free of a grid, such as a matrix of cells (squares or rectangles), with each cell in the prior art designed to accommodate a single game object. Thus, no such limitation need be imposed, as the user according to an aspect of the present disclosure may be given freedom to design the style, size and positioning of objects images corresponding to game elements. More than one such object image may be included by the user in any area that in prior art systems would correspond to a single cell of a matrix that accommodates only a single object. Further, according to an aspect of the disclosure, a single object image drawn or otherwise provided by the user on the game board image may be larger or may be correspond to portions of areas that in the prior art would correspond and be limited to such cells of a matrix in a grid.

Also contemplated is a computer system that provides a video game engine that carries out the methods herein described.

DESCRIPTION OF THE DRAWINGS

The accompanying Drawings provide visual representations to describe various representative embodiments. In these drawings, like reference numerals identify corresponding elements.

FIG. 3 is a flow chart of a method for codeless video game creation, according to an aspect to the present disclosure.

FIG. 4 illustrates a flow of steps of the method for codeless video game creation, according to an aspect to the present disclosure.

FIG. 8 is an example of pseudocode for an implementation of the type conceptually illustrated in FIG. 6, according to an aspect of the present disclosure.

DETAILED DESCRIPTION

A game engine that implements the method and comprises the system may comprise four major blocks: configuration, identification, consolidation, and consumer.

Figure 9:
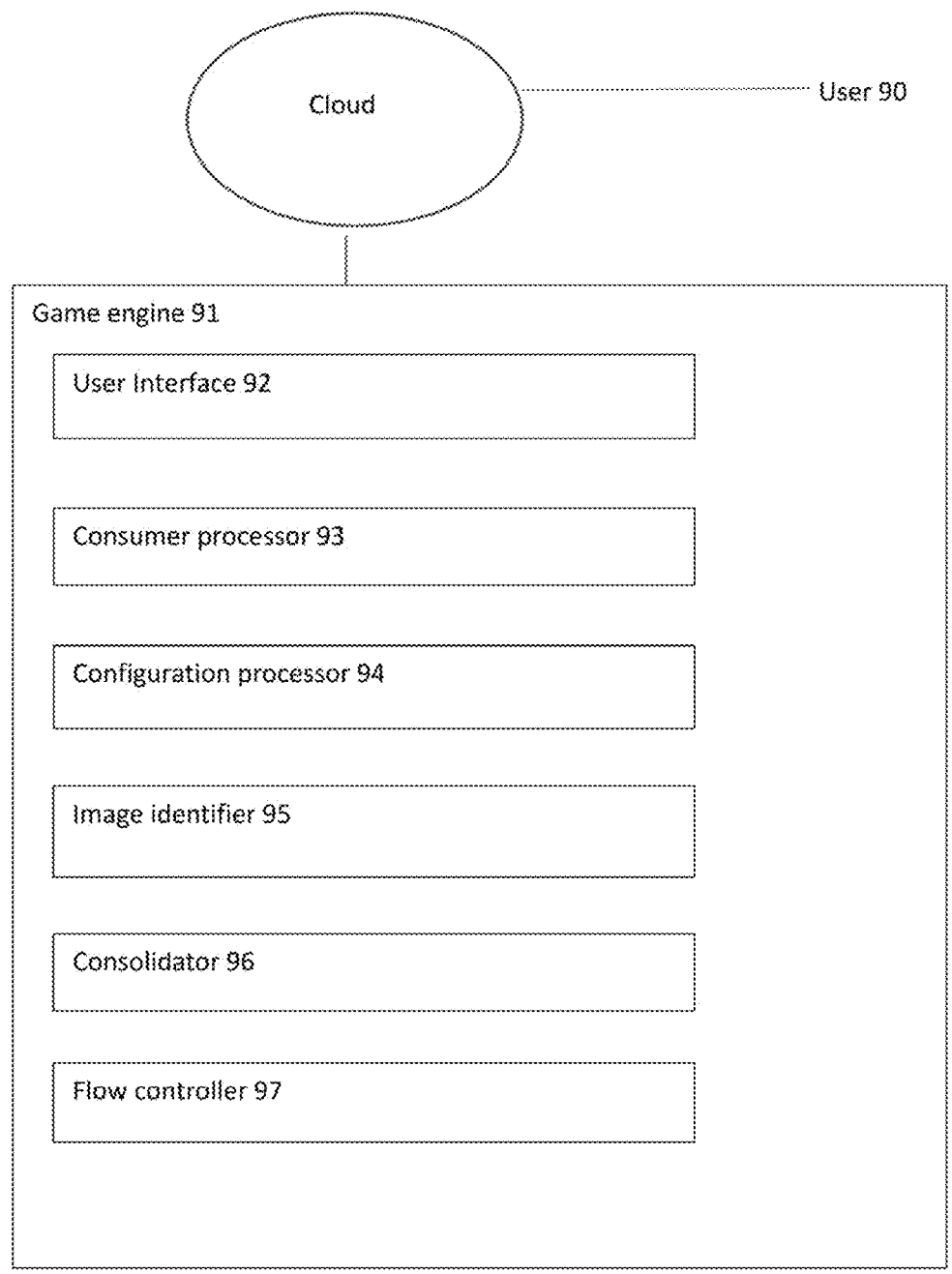
FIG. 9 is an example of a system diagram showing major components of a game engine and its relationship to a user, according to an aspect of the present disclosure.

A user may enter an image that he or she has drawn or otherwise created or obtained into the system, for example, by capturing a photograph of the image or drawing it, and transmitting it to the system. While described as residing on a server and accessed via the internet, it will be understood that a game engine 90 according to the present disclosure as illustrated in FIG. 9, or one or more components thereof, may reside on a local area network, wide area or ad hoc network, or may be downloaded onto a local device of the computer, such as to a desktop computer or mobile device of the user. A flow diagram for the system as a whole is shown in FIG. 3.

Identification

In what is sometimes referred to herein as the identification step performed by image identifier 95 illustrated as part of the game engine 91 shown in FIG. 9, the system provides a mechanism for accepting the input by converting it to named "layers." A layer may be an area of the input image that contains a figure of a character, such as an avatar, sprite, or a figure of another game object, such as an obstacle, or a portion thereof. Such layer identification in the image may include:

Color extraction: Given an arbitrary input image and a list of colors, match the colors to the image and convert each connected object of a single color to a layer prefixed with the color name. For example, one green circle would be named Green1, a green box would be named Green2, and so on.

Photoshop: Photoshop is already in image file format that is based on layers. We digest a Photoshop document and split each layer apart Image extraction: Given an arbitrary input image, detect sub images within it. For example, images of a cat would be extracted into individual layers prefixed as "cat1", "cat2", etc.

An overview of the identification, according to an aspect of the present disclosure is as follows, however, it will be understood that this is just an example. An overall goal may be to determine how to map the input, typically an image, including its components and regions, to a set of names corresponding to define game objects. The specific implementation may be done in many ways.

Input to the image identifier 95 may be user image data. An output of image identifier 95 may be:
1) An option available to the End User to select a configuration for the game in the Consumer processor 93 illustrated that is part of the game engine 91 shown in FIG. 9.
2) Documentation specifying what the expected input image should look like, and the names it maps to.
3) Data readable by the Consolidation step provided by consolidator 96 illustrated as part of game engine 91 in system diagram of FIG. 9. The consolidator 96 may expect the data in a particular predefined format. This data contains the name mapping the seed data based on data derived from regions in the input image to the templates. Examples:
1) This identification maps regions of solid colors to the representative color. It labels the regions as Green# or Blue# depending on which color the region is closest to.
2) This identification finds all cats and dogs in the input image and labels them as Cat# or Dog#
3) This identification find all Hershey kisses and Hershey peanut butter cups, and labels them as HersheyKiss# or PeanutButterCup#

Thus, part of the identification step performed by the image identifier 95 may be performing a mechanism for extracting spatial data out of image data. Most games and interactive software require a polygonal representation of an object, however, the representation may instead or in addition include a circle, an oval, a squiggly line etc. Such extraction may entail the following:

Run a "Connected component labelling" algorithm to find the individual components of the image;

For each component, identify all of the pixel locations for the boundary of the object;

Simplify the polygon identified using a simplification algorithm such as visvalingam's algorithm;

Other approaches include finding the image's bounding box, bounding radius or convex hull.

As outlined above, another aspect of this identification step performed by the image identifier 95 may be a mechanism for sending the extracted layer names along with their image and spatial data to a system of "templates" that have been defined in the system. According to the present example, the data may be sent as a ternary that may be called "seed data," that includes:

Layer name

Representative image

Representative polygon

Each seed data may be mapped according to its layer name to a template. For example the system of templates may include:

Hazard: something which kills the avatar

Goal: something an avatar must collect

Ground: something an avatar may walk on

Avatar: something a player may control.

Configuration

Such a system of mappable units of work may include:

Triggers—Initiate an event when something occurs. For example, an object being touched may be a trigger.

Actions—Perform an action upon an event. For example, an action might destroy an object.

Behaviors—Attribute or underlying way an object behaves in the universe. For example, if an object is affected by gravity.

Type: a concept which combines actions, events and behaviors together in a meaningful way.

Super type: basically the same concept as a type but the difference is a type may contain raw elements only (behavior, action and trigger). the super type may contain raw elements and other types.

Object: an individual component of the screen, game or application which is running.

To further illustrate these concepts, the following example may be helpful. A person walked into a room. Someone asked him to tell a joke. He told the joke. Everyone in the room laughed. Some clapped their hands.

Trigger: Request to tell a joke.
Event: A joke was told
Action: There are 3 actions:
1) A person tells a joke
2) A person laughs
3) A person claps
Behavior: There are 3 behaviors in this example.
1) The people in the room may hear
2) The people in the room may understand English
3) The people in the room have a sense of humor
Type: This example may have multiple types in it:
Type 1: Human
  1) Behavior to allow the person to hear
  2) Behavior to allow the person to understand English
Type 2: Human with a sense of humor
  1) Behavior to give the person to have a sense of humor
  2) Action to laugh
  3) Listen to event "a joke was told"
Type 3: Enthusiastic
  4) Action to clap whenever they laugh
Super Type: This example has 3 primary super types:
Super Type 1: Comedian
1) Contains type "Human"
2) Contains action "tell a joke"
3) Listens to trigger "request to tell a joke"
4) Emits event "a joke was told"
Super Type 2: Audience Member
1) Contains type "Human"
2) Contains type "Human with a sense of humor"
3) Contains type "Enthusiastic"
Super Type 3: Curious Person
1) Contains type "Human"
2) Initiates trigger "request to tell a joke"
Object: There are multiple objects:
The person that initiated the request to tell the joke;
The comedian;
The various audience members in the room.

A mechanism for combining the mappable units of work in a meaningful way may call these groups of work a "Type".

Figure 6:
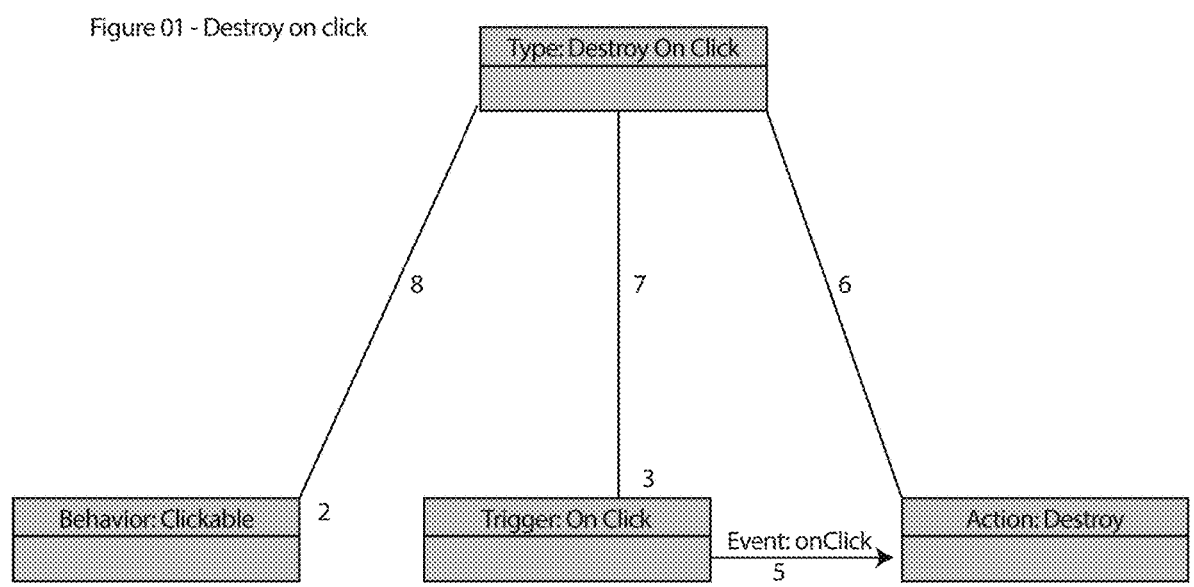
FIG. 6 is an example of a type that may be defined in the game engine for controlling behavior of a game element according to an aspect of the present disclosure.
Figure 7:
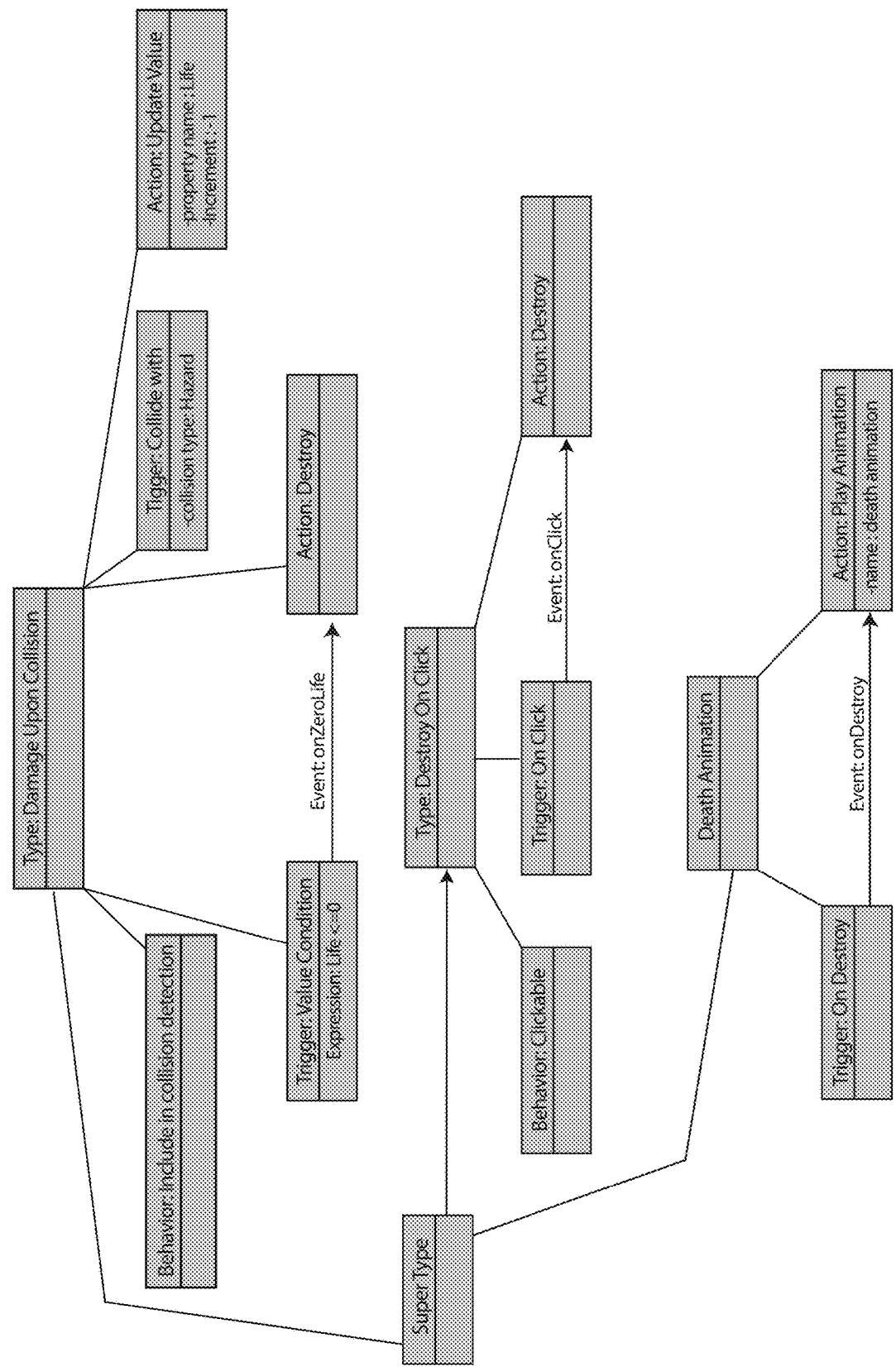
FIG. 7 is an example of a super type, a construct that includes more than one type, which may be defined in the game engine for controlling behavior of game elements according to an aspect of the present disclosure.

In our example we group together multiple actions, triggers and behaviors into one single concept called a "Type". For example, a single "Type" might be called "Destroy on click", as illustrated in FIG. 6, showing conceptual relationship, and FIG. 8, providing an example of pseudocode implementation. Such a type may contain:
  Behavior: clickable—makes the object recognize clicks
  Trigger: on click—fires an event upon click
  Action: destroy—triggered by the click event A mechanism for combining multiple "Types" together is illustrated in FIG. 7. For example, with the combination of types below an object would damage an avatar when they collide, but could be destroyed and play an explosion animation when a player clicks on it.
  "Type" 1: "destroy on click" as mentioned above.
  "Type" 2: "Damage avatar upon collision"—a "Type" which causes the object to detect collisions with another avatar and increase a damage counter when detected
  "Type" 3: "death animation"—A "Type" which causes an animation to play when the object is destroyed.

A mechanism for pre-defining groups of "types" based on an arbitrary input name may also be provided. For example, wildcards and regex's for name matching may be used:
Player*: contains types "player controls" and "collect coins"
Hazard*: contains types "damage avatar" and "destroy on click"
Coin*: contains types "collide with avatar" and "increase avatar value"

As a result, any layers in the input whose prefix is Hazard would acquire the types "damage avatar" and "destroy on click". Image identifier may employ a variety of off-the-shelf software as part of its processing, including Photoshop, Illustrator, and Gimp. A behavior of a game element may include one or more of a position of a game element as displayed during playing of the video game, changing a position of a game element, scaling a game element, rotating a game element, and removing a game element. Customizing a template by a user may result in changing one or more of selecting a position of a game element when the video game is played, changing a position of a game element, scaling a game element, rotating a game element, and removing a game element.

Figure 10:
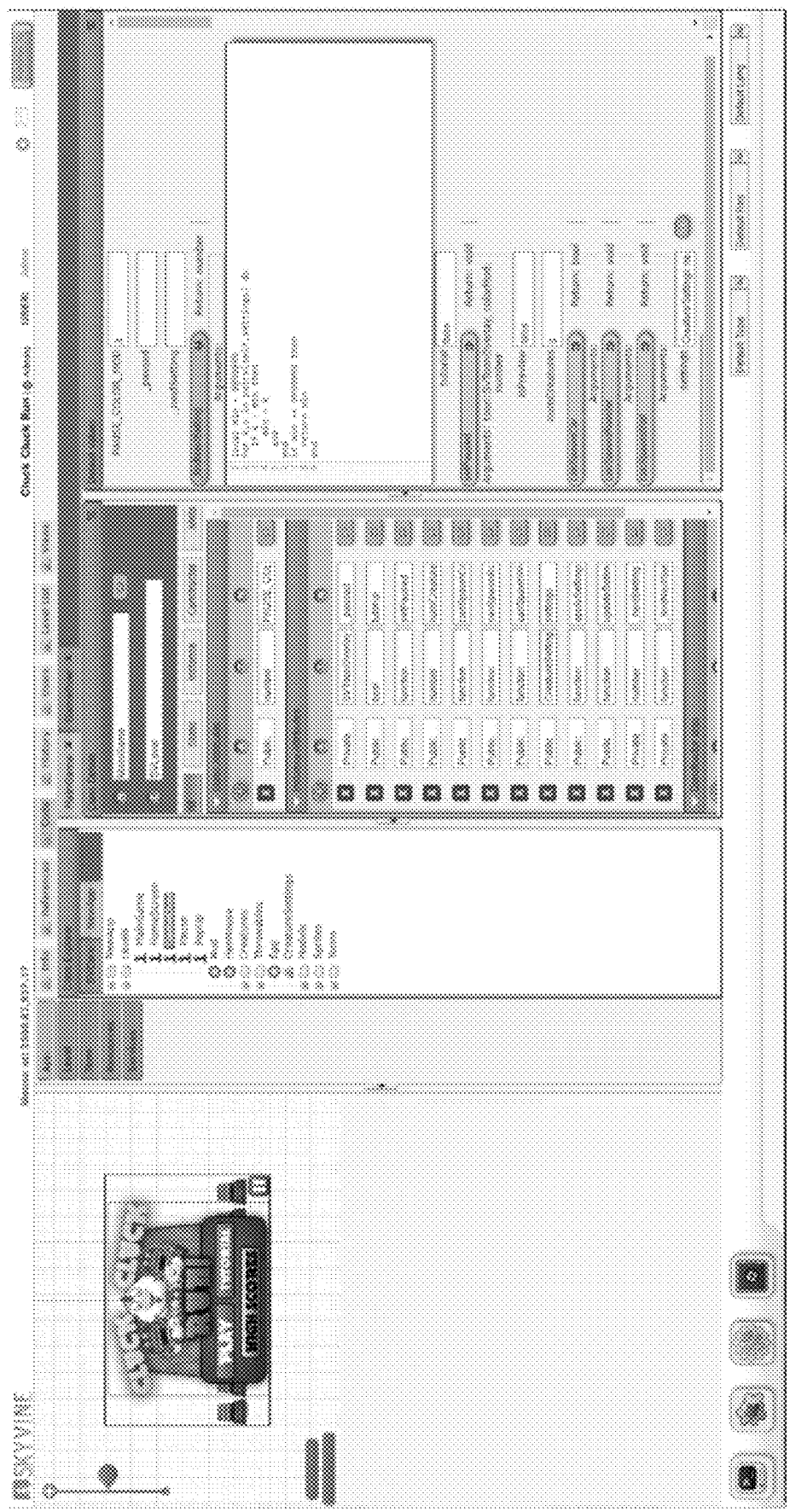
FIG. 10 is screenshot showing an example of customization of templates that a more advanced user may use to customize one or more templates that control behavior of game element displayed in the video game or may control a configuration of the game as a whole.

An illustrative screen shot for customizing the templates for customizing game object behavior is shown in FIG. 10. This may be done by a more advanced user.

A combination of Types and Super Types along with the layer name mapping defines a Template. The user may also enter a system Template to a Configuration processor 94 of game engine 91 shown in FIG. 9. As an option, the end user may select a game template, or may enter a template through a user interface, to control a game object.

For example, one game template may be a shooting game in which the user accrues points by using an avatar or sprite controlled by the user during the playing of the video game to hit targets; another template may a chase game in which an avatar controlled by the user during play is chased by threats and has to avoid hazards, which may also move, and obstacles, which may be stationary but deadly to the avatar on contact. Another template may be chase game in which the user's avatar chases other game elements to accrue points, or both chases some game elements and is chased other game elements displayed during the video game. In yet another game template, the user controls an avatar that has to "hit" back a "ball" to another character, controlled by a second user in the same location as the first user or playing from a remote location in real time, for example, by also connecting to the server and also displayed the video game in real time. It will be understood that a second player may also participate in many other game configurations, and that the second player may be implemented by the video game engine 91 instead of by a human.

Consolidation

Internal to the system may be a consolidation step performed by consolidator 96 of game engine 91 illustrated by system diagram of FIG. 9. This may be an internal step whose goal is to combine the "Template" and the "Seed Data". The output may take many forms but it would be a program of instructions that provides/controls the video game.

Inputs of consolidator 96 at time of development of the system may include:

Template data format

Seed Data format

Inputs at runtime of the consolidator 96 may include:

A selected template (which may be selected in the Consumer processor 93 and input by it to the consolidator 96)

Seed Data (which may be output from Identification step by image identifier 95 to consolidator 96)

An output of consolidator 96 shown in the game engine 91 illustrated in FIG. 9 may the following:

A "Program of instructions" that may contain the interpreted data. This may contain the following for each distinct region identified in the Seed Data:

An output image that is the digital game board on which the game elements are moved around in the video game;

Shape and Positioning

An optional prompt to an End User to select via Consumer processor 93 a configuration, as discussed above, to control a game objective.

Documentation specifying the name mapping and provided as the "Template".

Data readable by the Consolidation step by consolidator 96 to be used for the templates to generate the program code that is executed to provide the video game.

Examples:

Green*=>Your Avatar, may move left, right, jump double jump

Blue*=>Goals your avatar must collect to win the game

Cat*=>An avatar you may control

Dog*=>A hazard, chases the closest Cat* it finds

HersheyKiss*=>Moves to the Left conveyor belt

PeanutButterCup*=>Moves to the Right conveyor belt

Behavior definition of the region.

Examples:

Program contains Green and Red regions (images), the shapes associated with those images, and the data which describes to the Consumer how the regions behave.

Program contains Hershey Kiss and Peanut Butter Cups regions (images), the shapes associated with those images, and the data which describes to the Consumer how the regions behave.

Consumer Processor

Consumer processor 93 illustrated in FIG. 9 may be used by end user to interact via user interface 92 with game engine 91. Consumer processor 93 may prompt the user to enter the image, warn the user in case the image may not be read or in case of other errors, prompt the user to enter a game configuration, and provide other input and output functionality. The end user may be provided with the ability to select which template will be used for the game, input their data (typically an image) and view the end result. The consumer may be implemented in many ways and the following is provided only as an example.

Inputs at runtime of consumer processor may include:

Available configurations

Input image

Its output may include:

End user is allowed to select an available configuration so end user may upload or select an input image, such as a drawing or photograph.

End user may then utilize the Program of instructions generated by the game engine 91 as the end result of the user's input image and selected system configuration Examples:

End user draws an image. End user selects the "Get the goal" configuration. End user uploads a picture. End user plays the game generated by their picture.

End user selects the "Animals" configuration. End user uploads a picture of animals. End user views the simulation watching dogs chase cats.

End user selects the "Hershey" configuration. Robot uploads picture of current conveyor belt. Final program instructs robot on how to sort the pieces on the conveyor belt.

In the configuration block, the system specifies fundamental functionality available to a developer using the system to create the game for the player to play. In the identification block, the system receives the developer's identification of tools the developer is using to create the game for the player to play. In the consolidation block, the system receives the developer's tools and prepares the game for display to the player and for play by the player. For example, providing comprises downloading the playable game, using the consumer, to the player. In the consumer block, the system presents the game to the player using the system's game display for the player to play. The player reads the consolidation data, which in turn leverages a combination of the configuration and identification blocks. As shown in detail in FIGS. 2A-2S, by drawing a blue dot and a green dot in the maze, the developer may turn that maze into a digital game.

As discussed, the configuration processor 94 illustrated in FIG. 9, the system specifies fundamental functionality available to the developer using the system to create the game for the player to play.

The system may perform the configuration in many ways, for example, using one or more of a spreadsheet program such as Excel and a custom web-based application.

The developer publishes a system for name mapping in the configuration block with a description of what the names do, available identification processes, and options for the consumer block. For example, publishing comprises publishing a system for mapping a name of a layer to a function of the layer, wherein a layer is defined as a single component of an image. For example, the configuration block publishes the system for mapping the name of the layer to the function of the layer. For example, publishing comprises providing the developer with an opportunity to select a consumer to perform the providing step using the consumer block.

The system publishes the configuration, from which the developer understands the requirements, creates his or her drawing, and uploads and views the drawing in digital form. For example, the developer learns the requirements by reading an instruction sheet or viewing a video file. For example, the developer creates the drawing by tearing a page from a coloring book and adding a few dots. For example, the developer uploads the drawing by taking a picture with an external device. For example, the picture comprises a color picture. For example, the external device comprises one or more of a computer, a tablet, a laptop, a notebook, a mobile phone, and a standalone camera.

As discussed, image identifier 95 illustrated in FIG. 9 receives the developer's identification of tools the developer is using to create the game for the player to play. A layer may be defined as a single component of an image. For example, an image comprising a driveway, grass, a house, the sky and the sun, comprises five separate layers named driveway, grass, house, sky, and sun.

The developer need not know the details of the configuration beyond layer naming requirements and descriptions.

For example, identifying may entail converting the user's input to named layers usable in creating the game. The identification block may perform one or more of color extraction and digesting an illustration program using a layer naming convention. For example, the layer naming convention may be predetermined by the system. For example, the identification block may use an Application Programming Interface (API).

The system detects sub-images within the input image. For example, the system may extract images of a cat into individual layers prefixed as "cat1," "cat2," and so on.

The system may define a mechanism for extracting spatial data from image data. For example, the system may use a polygonal representation of an object. For example, the color extraction comprises extracting the spatial data from the image data. For example, the system performs the color extraction using the polygonal representation of the object.

The system may define a mechanism for sending the extracted layer names along with their image and spatial data into a template. Once created, the template may be reused by the system for any number of applications with arbitrary inputs.

For the embodiments that use color extraction in the identification block, the system may receive an input image and matches colors in the input image to a list of colors. Using the matches, the system converts an object of a given color to a layer comprising a name of the color. For example, the layer comprises a prefix that in turn comprises the name of the color. For example, the system categorizes a green circle using a label "Green1." For example the system categorizes a green box using a label "Green2."

Illustration Program: For example, the illustration program may comprise one or more of Photoshop, Illustrator, Gimp, and another illustration program. Taking Photoshop as an example, the system digests a Photoshop document and splits apart each layer in the Photoshop image file format, which is based on layers.

For example, the layer naming convention used in the API monkey is named "Player," the spikes are named "Hazard1" and "Hazard2". Goals in the form of berries are named "Goal1", "Goal2" and "Goal3". Bricks used as boundaries are named "Ground1", "Ground2", "Ground3", "Ground4". Since these names match the configuration, the system may process this illustration program document and use it to create the game. The resulting document comprises layers called "Goal*", "Ground*", "Hazard*", "Player" and "Images*". With the exception of "Images", these layer names correspond to the naming convention specified in the configuration block.

The arbitrary layer names permitted by use of the illustration program documents allow the developer to leverage the configuration block in different ways. For example, the configuration API could specify the following layer names and add-on functionality:

Add-ons:
"pulse"=makes the layer shrink and grow
"hidden"=makes the layer invisible
"moveRight(X)"=makes the layer move in a rightward direction at a speed of X A developer that named the layers "PlayButton pulse," "Hazard1 hidden," and "Hazard2 moveRight(20) pulse" could thereby create further customizations by using a combination of the layer naming, and the add-on features.

Consolidator 96 receives the developer's tools and prepares the game for display to the player and for play by the player. The below steps define a mechanism for combining the template and the input developer data to generate a meaningful game program. For example, consolidating comprises applying a pre-defined attribute to the input. For example, consolidation is performed using Java Script Object Notation (JSON). For example, the consolidation block consolidates the tools using JSON.

Consumer processor 93 of game engine 91 shown in FIG. 9 implements functions for interacting with the user. Consumer processor may present the game to the player using the system's game display for the player to play using the program of instructions generated by consolidator 96.

The consumer may be implemented in such a way that it is agnostic to the source of the data but considers only the program of instructions.

Game engine 91 may reside on one or more of computer, a tablet, a laptop, a notebook, a mobile phone, and another device, and the video game provided to the user may be played by the user on the same device as the device on which game engine resides or one or more remote devices.

The player may employ custom settings that modify the game. The custom settings will result in an injection of different configuration options. For example, after the consolidation step is done, the player may implement a mechanism to inject data into the data for an object. As an example, the player may define its own behavior called "Rotate" and may inject the "Rotate" behavior onto the avatar, causing the avatar to rotate.

Two developers may wish to share games they are creating with each other. Alternatively, or additionally, a developer may wish to share a game that developer is creating with one or more of another developer and a player. For example, the user may wish to share the game that the developer is creating with a second developer. Embodiments of the invention allow the developer wishing to share the game to create a virtual room that both the sharing developer and the developer receiving the shared game may join.

Figure 1:
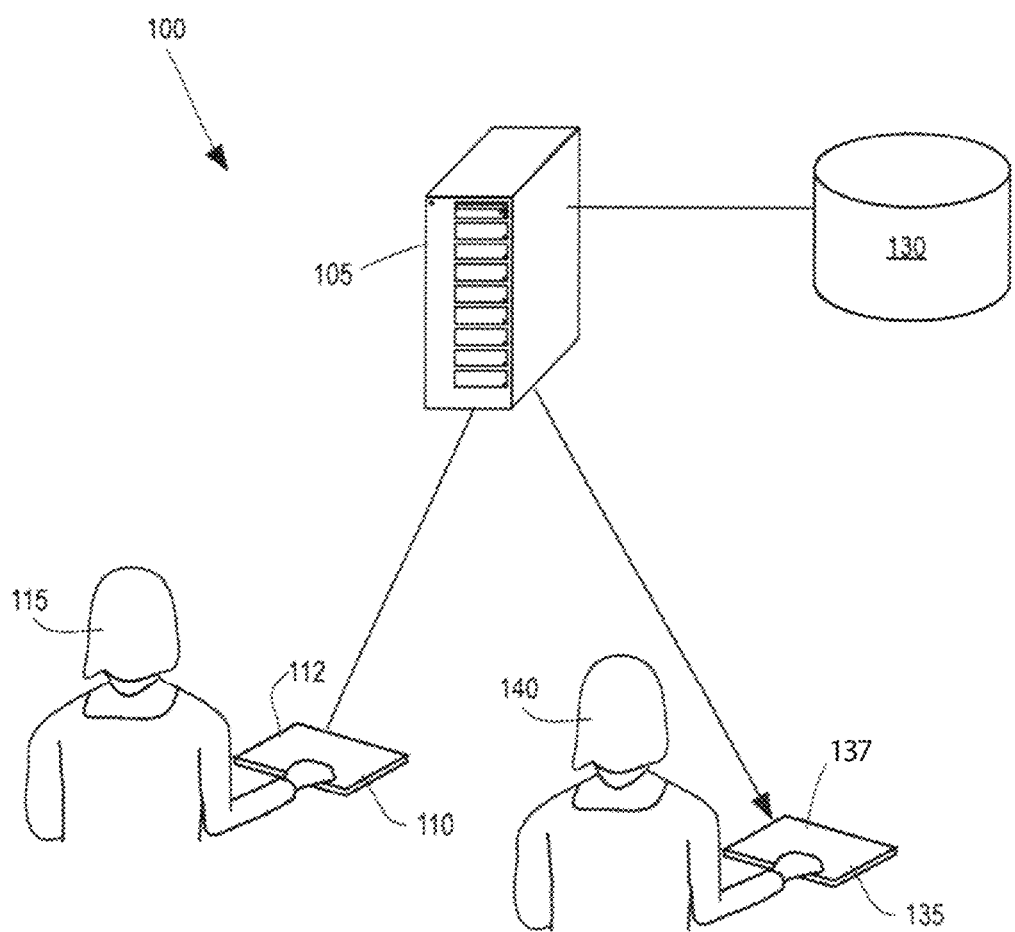
FIG. 1 is a system diagram for a system for codeless video game creation.

FIG. 1 is a system diagram for a system 100 for codeless video game creation. The system 100 comprises a game creation server 105. For example, the game creation server 105 comprises one or more of a database, a processor, a computer, a tablet, and a mobile phone. The system 100 further comprises a developer interface 110. The developer interface comprises a developer interface screen 112. The developer interface 110 is configured to receive from a developer 115 game development input (not shown) configured to develop and create a game. For example, the developer interface 110 comprises one or more of a database, a processor, a computer, a tablet, and a mobile phone. The developer interface 110 is operably connected to the game creation server 105 via a network 120, including a wired or wireless connection. The game creation server 105 is operably connected to storage 130.

An external device 135 may also be provided and may comprise an external device screen 137 to receive from a user input configured to create a game. For example, the external device 135 is configured to upload to the server 105 game creation data (not shown) received by the external device 135. The server 105 is configured to then upload the game creation data to the storage 130. Alternatively, or additionally, the external device 135 may be operably connected to the game creation server 105 via one or more of the second network (not shown) and a third network (not shown).

Figure 2C:
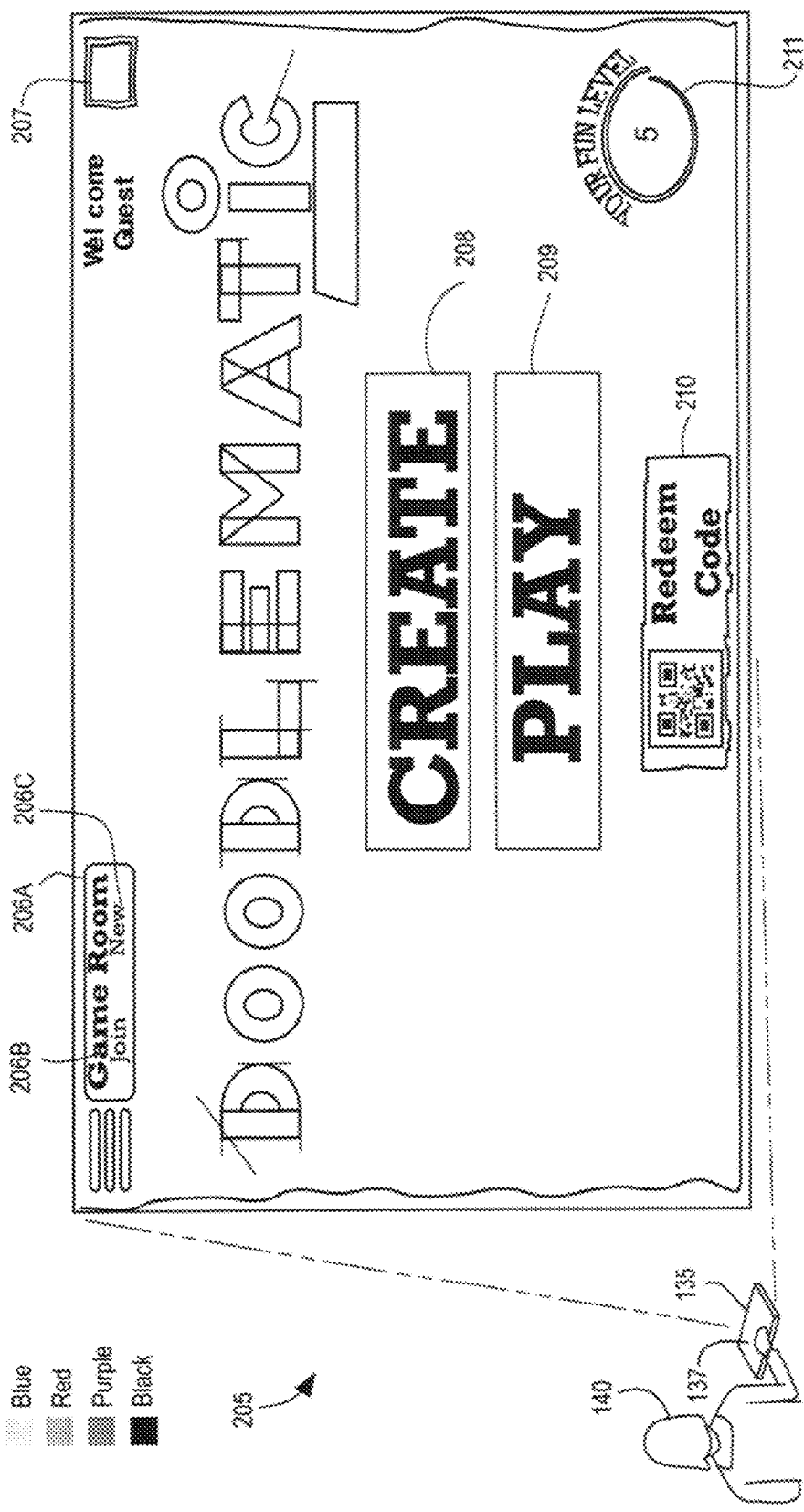
FIGS. 2A-2S depict an example of the codeless video game creation platform being used by a developer to create a maze traversal game using a maze provided from the developer.
Figure 2D:
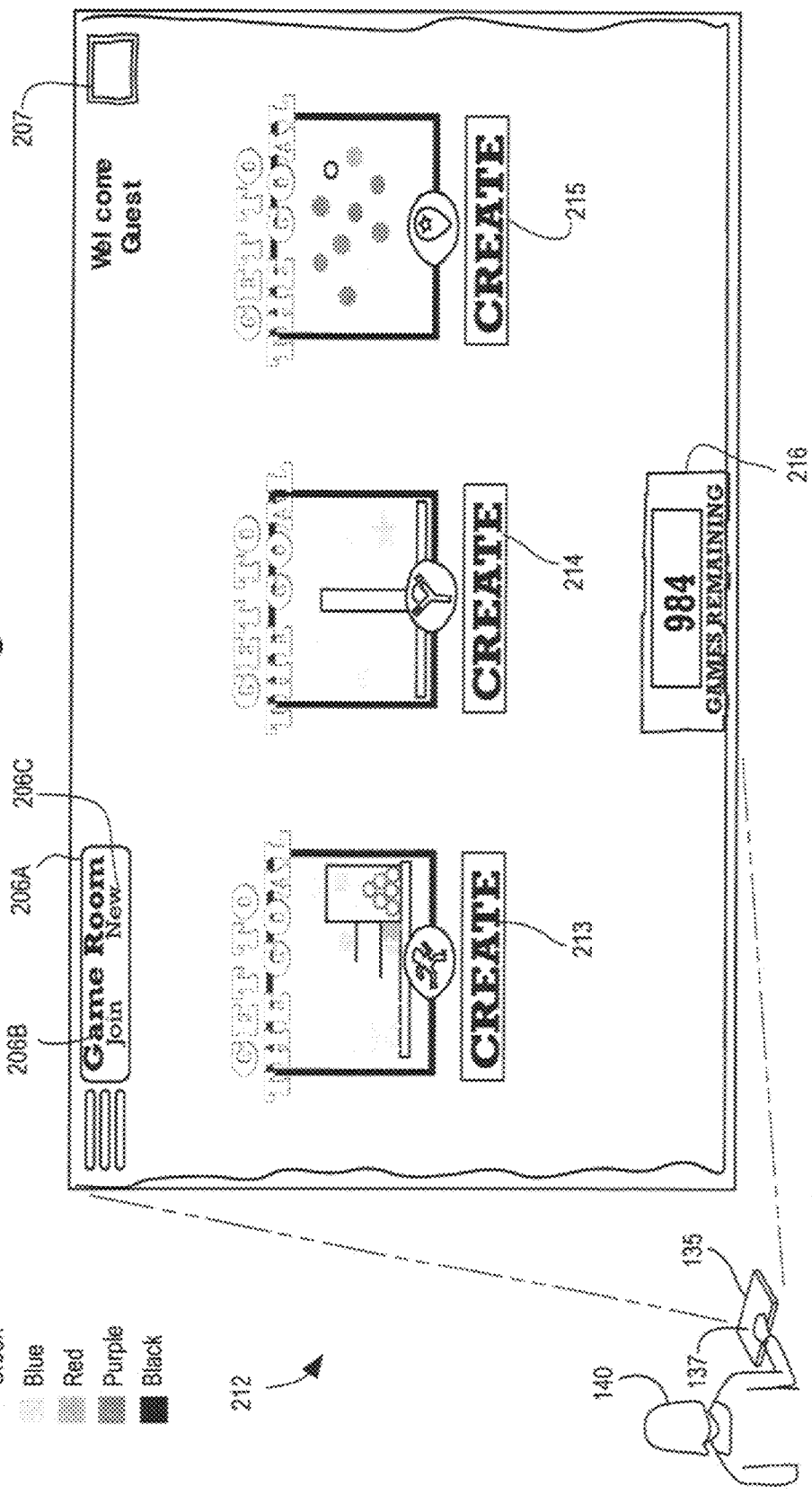
Figure 2E:
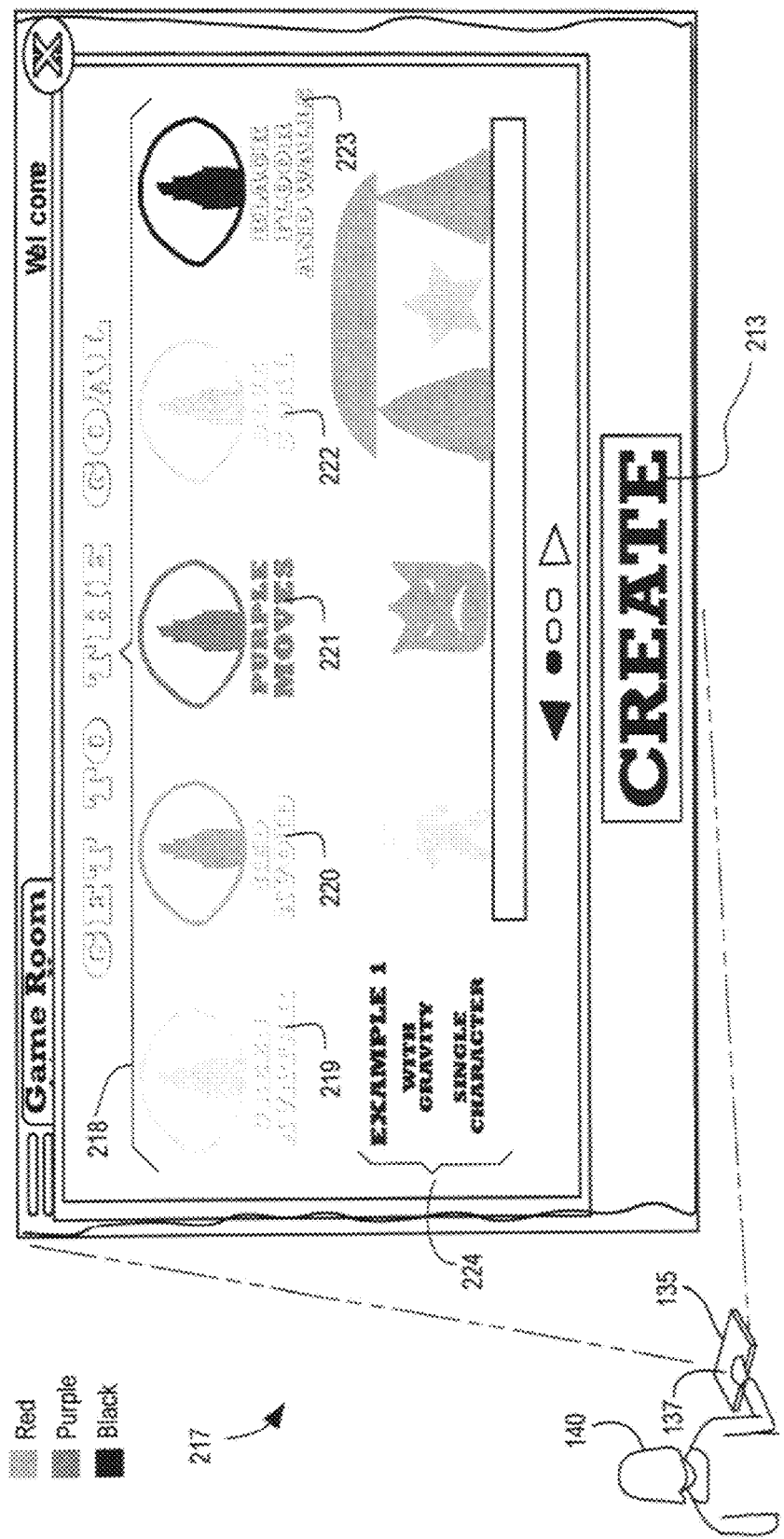
Figure 2L:
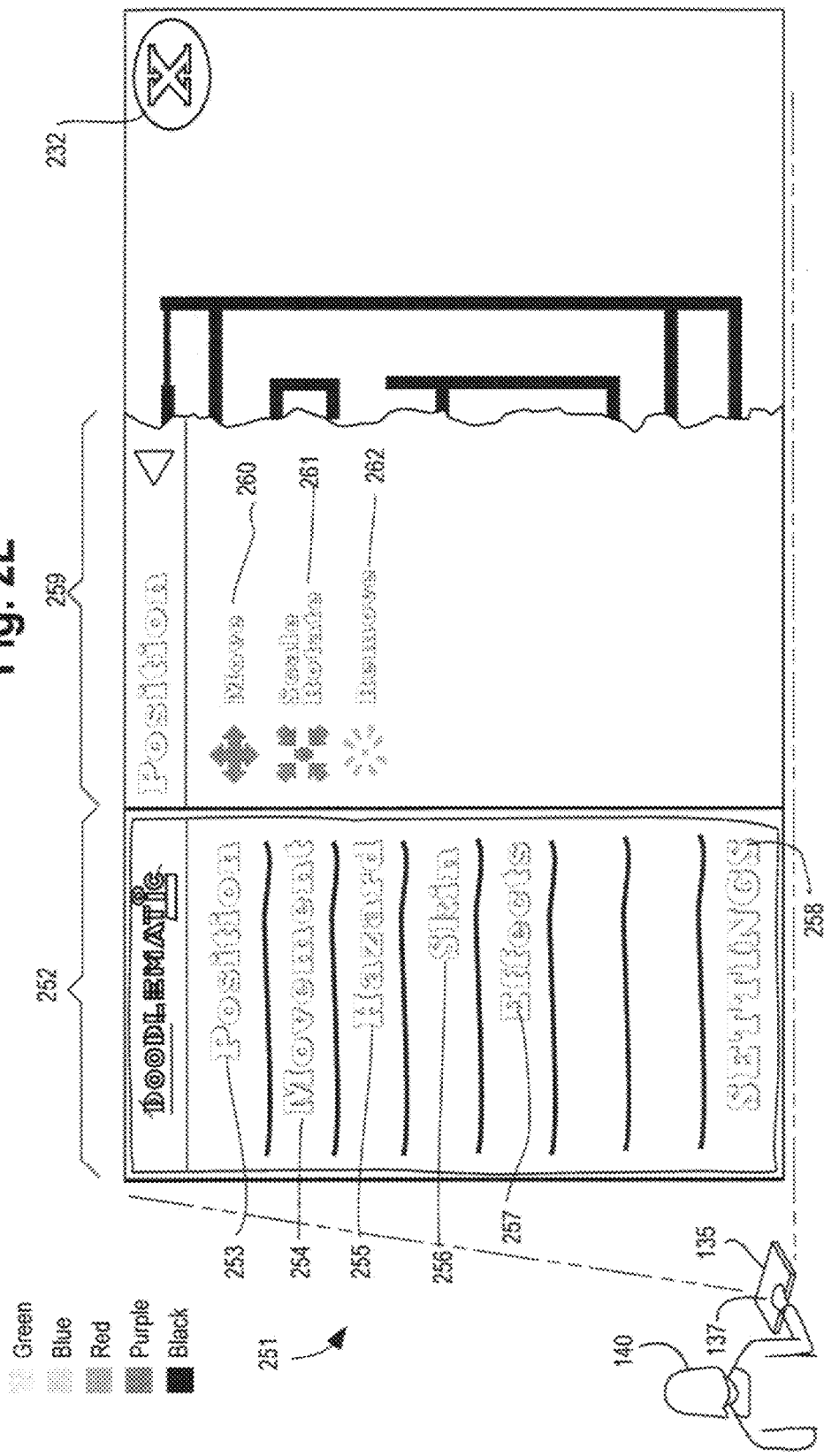
Figure 2N:
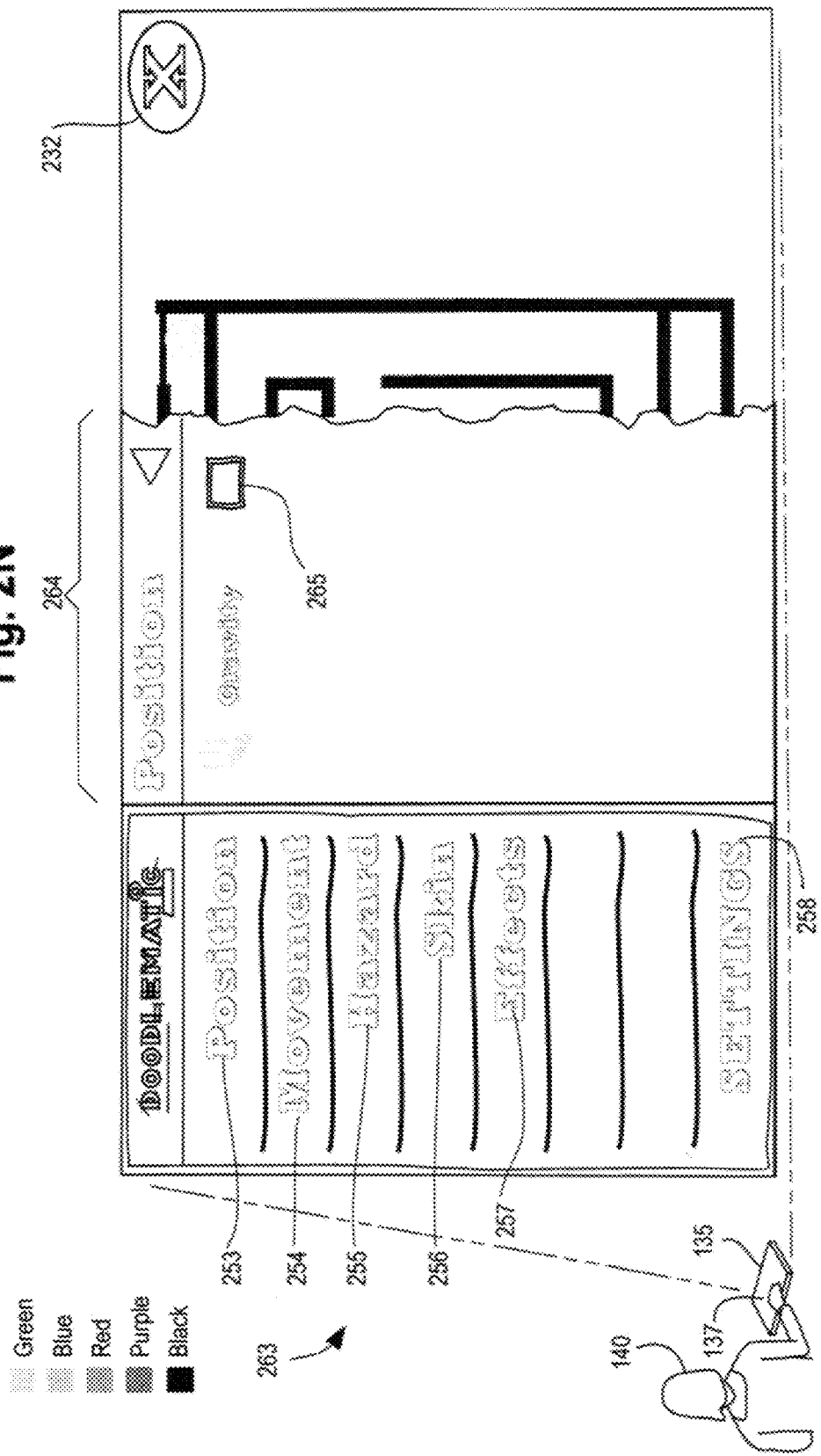
Figure 2S:
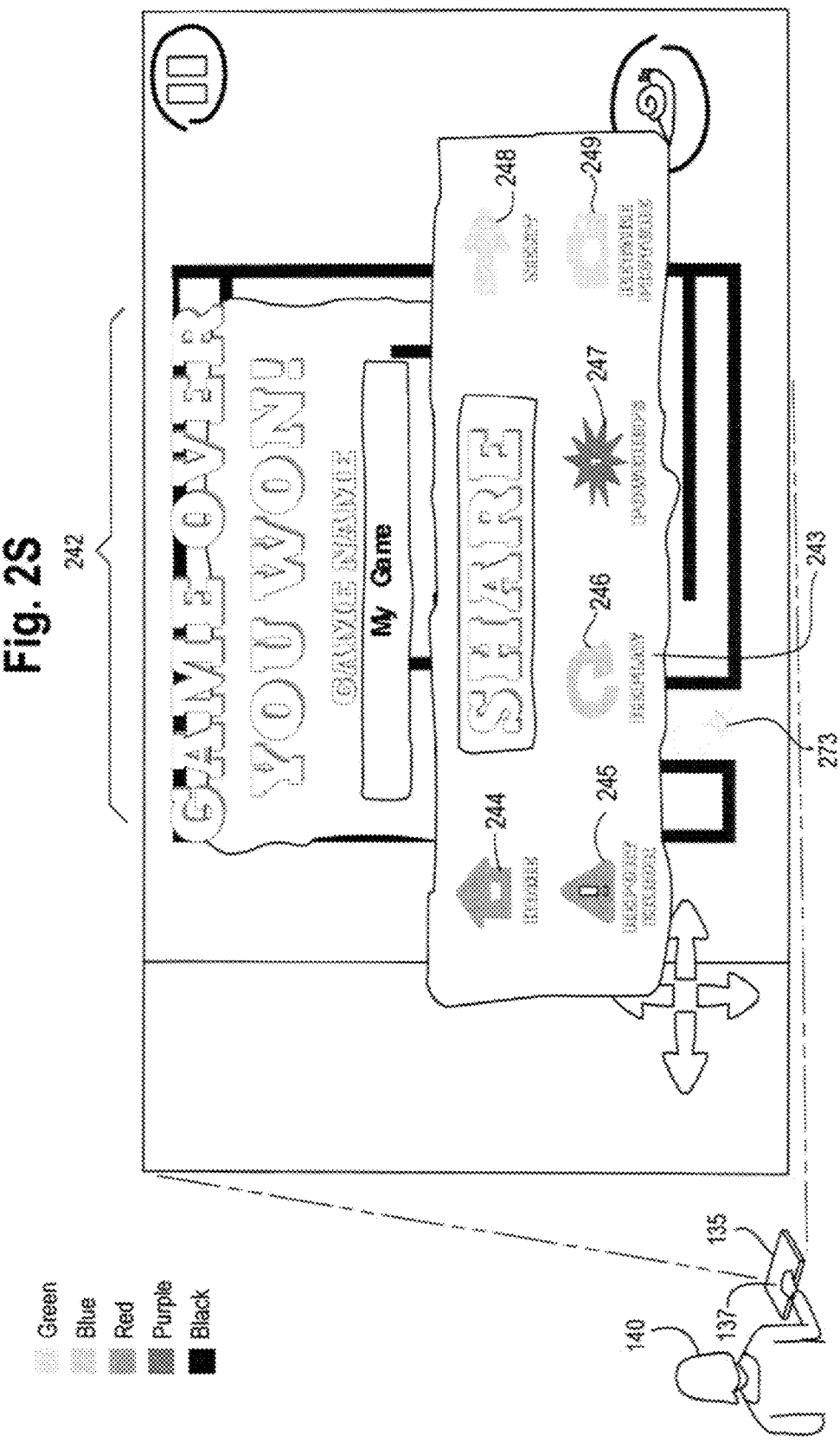
Figure 5:
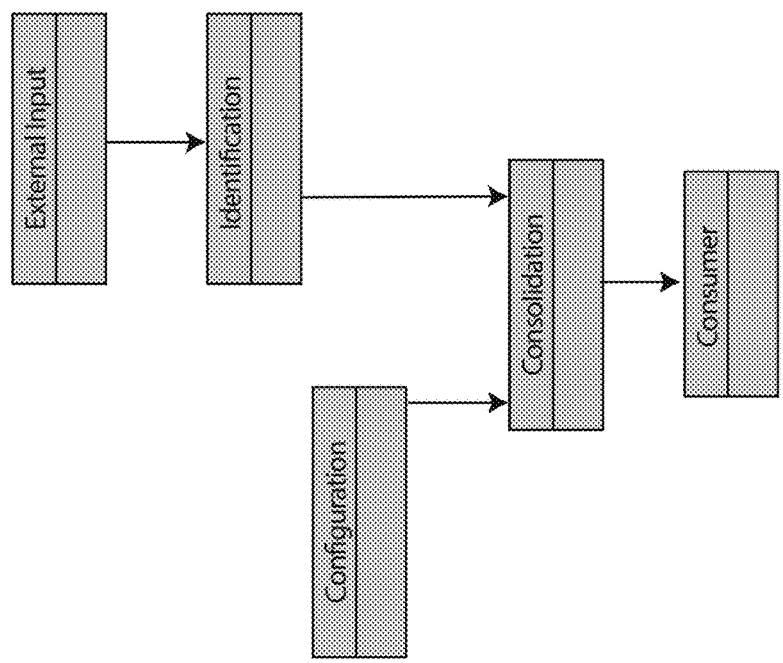
FIG. 5 is a system diagram showing major components of the game engine and their inputs and outputs, according to an aspect of the disclosure.

FIGS. 2A-2S depict an example 200 of the codeless video game creation platform being used by a developer to create a maze traversal game using a maze provided from the developer.

In FIG. 2A, user selects a printed maze 201 from a game book or similar resource. The developer 115 then draws on the printed maze 201. For example, the developer 115 then draws on the printed maze 201 using colored markers. Using the developer interface 110, the developer 115 uploads the printed maze 201 to the server (not shown in this figure) using the network (not shown in this figure). For example, the developer interface 110 comprises one or more of a database, a processor, a computer, a tablet, and a mobile phone.

In FIG. 2B, using the external device screen 137, the external device 135 displays a maze 201A pursuant to the uploaded specifications of the developer 115 (not shown in this figure). Using the external device screen 137, the external device 135 draws in a green color an avatar 203 that the player 140 controls. For example, the avatar 203 comprises a happy face. Using the external device screen 137, the external device 135, draws a maze end 204 using a blue color. For example, the maze end 204 comprises a five-pointed star.

In FIG. 2C, using the external device screen 137, the external device 135 may present the player 140 with a home screen 205 of the codeless video game creation platform. The home screen 205 comprises a "Game Room" button 206A. The "Game Room" button 206A comprises a "Join" button 206B that when a player 140 selects it, results in the player 140 being offered the opportunity to join a room with a set of pre-made games. The "Game Room" button 206A further comprises a "New" button 206C that when the player 140 selects it, results in the player 140 being offered the opportunity to create a new room into which the player 140's games may be stored.

The home screen 205 may further comprise a "Welcome Guest" text 207 that shows the current player 140's name. The home screen 205 further comprises a "Create" button 208 that when the player 140 selects it, results in the player 140 being able to create a new game using the codeless video game creation platform. The home screen 205 further comprises a "Play" button 209 that when the player 140 selects it, results in the player 140 being able to play a game that already exists using the codeless video game creation platform. For example, the player 140 plays a game that the player 140 created previously. For example, the player 140 plays a game created by another player 140.

The home screen 205 may further comprise a "Redeem Code" button 210. When the player 140 selects the "Redeem Code" button 210, a camera (not shown) pops up that is configured to take a photograph of a player 140's QR code (not shown). For example, the player 140 purchases the QR code as part of a game package. The home screen 205 further comprises a player 140 level button 211. The player 140 level button 211 is configured to display a level of the player 140 in the game currently being played. As depicted, the level of the player 140 in the current game is 5. As depicted, the player 140 level button 211 comprises the legend, "Your Fun Level." The player 140 selects the "Create" button 208.

In FIG. 2D, using the external device screen 137, in response to the player 140's selection of the "Create" button 208 in FIG. 2C, the external device 135 next may present the player 140 with a first game screen 212. The first game screen 212 as depicted comprises three different game creation options, a first game creation option 213, a second game creation option 214, and a third game creation option 215, each of them corresponding to a different configuration. As depicted in this example, each of the first game creation option 213, the second game creation option 214, and the third game creation option 215 comprises a respective "Create" button which, when the player 140 selects it, initiates creation of the selected game by the player 140 using the codeless video game creation platform. The first game creation option 213 comprises a game titled, "Get to the Goal." The second game creation option 214 allows the player 140 to create a game titled, "Super Slingshot." The third game creation option 215 allows the player 140 to create a game titled, "Touch to Win." The system provides the game creation options 213-215 from which developers select the game type they are creating.

Other possible game creation options 213-215 available to a player 140 to create from a drawing using the codeless video game creation platform may include one or more of pinball, pachinko, marble run, and air hockey. For example, the air hockey option comprises multi-player air hockey.

As depicted, each of the first game creation option 213, the second game creation option 214, and the third game creation option 215 may also include a respective icon illustrating the respective game associated with the particular game creation option 213-215. The first game screen 212 further comprises a "Games Remaining" indicator 216. The "Games Remaining" indicator 216 comprises a number illustrating a number of games the player 140 has remaining under the player 140's current plan. As depicted, the player 140 currently has 984 games remaining.

The first game screen 212 further comprises the "Game Room" button 206A, which again in turn comprises the "Join" button 206B and the "New" button 206C. The first game screen 212 further comprises the "Welcome Guest" button 207. The player 140 selects the first game creation option 213, thereby selecting to create a "Get to the Goal" game.

In FIG. 2E, using the external device screen 137, the external device 135 in response to the player 140's selection of the first game creation option 213, meaning that the player 140 will be creating the "Get to the Goal" game, may present the player 140 with a popup game parameters screen 217.

The game parameters screen 217 comprises a configuration panel 218 for the "Get to the Goal" game. As depicted, the configuration panel 218 comprises five types: an avatar 219 controlled by the player 140 in the game, a hazard 220 presenting possible danger to the avatar, a movable object 221 presenting an obstacle to the avatar's movement that may be movable by the avatar 219, a goal 222 whose achievement relates to the avatar 219 winning the game, and a boundary 223 limiting movement of the avatar 219 and (unlike the movable object 221) not movable by the avatar. For example, the avatar 219 wins the game if the avatar achieves any of the goals 222. For example, the avatar 219 wins the game if the avatar achieves all of the goals 222. For example, the avatar 219 wins the game if the avatar achieves one or more of a predetermined percentage and a predetermined number of the goals 222.

The game parameters screen 217 further comprises an example panel 224. As depicted, "Example 1" comprises a drawing showing a single character playing the game with gravity present, with a hazard visible, and with a goal visible inside a movable object 221. The game parameters screen 217 again comprises the first game creation option 213, which, after being pressed by the player 140, initiates the "Get to the Goal" game. The player 140 again selects the first game creation option 213.

The avatar 219 according to this example may be controlled by the player 140 and may be able to do one or more of move to the left, move to the right, move up, move down, perform a single jump, and perform a double jump. The single jump and the double jump are only available when gravity is turned on in the game. Moving forward and moving backward are only available when gravity is turned off in the game. For example, the system associates a green color with the avatar 219.

The hazard 220 kills the avatar 219 if the avatar 219 contacts the hazard 220. For example, the system associates a red color with the hazard 220. The movable object 221 comprises an object that may be moved by the player 140. For example, the system associates a purple color with the movable object 221. The goal 222 comprises one of the items the avatar must collect. The avatar 219 must collect all the goals 222 to win the game. Alternatively, or additionally, instead of a goal 222 comprising an item that the avatar must collect to win the game, the goal 222 may instead be a destination to which the avatar must travel to win the game. Alternatively, or additionally, instead of a goal 222 comprising an item that the avatar must collect to win the game, a set of goals 222 is provided and the avatar must collect a subset of them to win the game. Alternatively, or additionally, the avatar must collect five of seven total goals 222 to win the game. For example, the system associates a blue color with the goal 222. In this example, the goal 222 comprises the maze end 204 (not shown in this figure).

Continuing with this illustrative example, and in no way limiting the scope the invention, boundary 223 may comprise one or more of a floor, a wall, and ground. For example, the system associates a black color with the boundary 223. In FIG. 2F, in response to the player 140's selection of the first game creation option 213, using the external device screen 137, the external device 135 presents the player 140 with an identification screen 225. The system activates a camera 226 that is configured to assist with the identification process. For example, the camera 226 is comprised in one or more of a computer, a notebook, a laptop, a mobile phone, a tablet, and another device. For example, the camera 226 comprises a standalone camera 226. To further assist with the identification process, the system displays a photograph frame 227 usable by the player 140 to align the picture to be taken by the camera 226. As depicted, the frame 227 outlines a photographable region bounded by a left boundary marker 228, a right boundary marker 229, a top boundary marker 230, and a bottom boundary marker 231. The player 140 aligns the original printed maze 201 from FIG. 2A with the frame 227 and then takes a picture with the camera 226.

The system receives the original printed maze 201 and processes it using a color extraction method that comprises labeling a region of the picture 201 using a predominant color of the region. For example, the system labels regions as one or more of red, green, blue, black, and purple.

In FIG. 2G, after the picture is taken, using the external device screen 137, the external device 135 presents the player 140 with a consolidation screen 233. For example, consolidation is done using Java Script Object Notation (JSON). The consolidation screen 233 comprises a plurality of game icons 234A-234L. The system generates at least one game icon 234A-234L by receiving a photograph from a player 140 in a process similar to the process depicted in FIG. 2F in this example. Preferably, but not necessarily, the system generates each game icon 234A-234L by receiving a photograph from a player 140 in a process similar to the process depicted in FIG. 2F in this example. Thus, images of game elements may be uploaded or selected by a user independently and in addition to the overall game image uploaded by the user.

The consolidation screen 233 may further comprise the "Game Room" button 206A, which again in turn comprises the "Join" button 206B and the "New" button 206C. The consolidation screen 233 further comprises the "Welcome Guest" button 207.

The player 140 selects a game icon 234A-234L for the player 140's next game. The player 140 selects game icon 234A, which is the game icon 234A corresponding to the original printed maze 201 the player 140 submitted in FIG. 2F.

In FIG. 2H, after the player 140 selects the game icon 234A in FIG. 2G, using the external device screen 137, the external device 135 takes the player 140 to a first consumer page 235. The first consumer page 235 comprises a first screenshot 235 of the "Get the Goal" game in progress. The first consumer page 235 further comprises the maze 201, the entrance line 202, the avatar 203, and the maze end 204.

The first consumer page 235 may further comprise, according to the example illustrated, a left arrow 236, which, if the player 140 selects it, moves the avatar 203 to the left. The first consumer page 235 further comprises a right arrow 237, which, if the player 140 selects it, moves the avatar 203 to the right. The first consumer page 235 further comprises a jump button 238, which, if the player 140 selects it, causes the avatar 203 to jump upwards. The first consumer page 235 further comprises a pause button 238A, which, if the player 140 selects it, causes the game to pause until the player 140 selects the pause button 238A again. The pause button 238A operates as a toggle switch. The player 140 selects the left arrow 236 in order to move the avatar 203 to the left along the top of the maze 201.

In FIG. 2I, after the first consumer page 235, using the external device screen 137, the external device 135 takes the player 140 to a second consumer page 239. The second consumer page 239 comprises a second screenshot 239 of the "Get the Goal" game in progress. The second consumer page 239 further comprises the maze 201, the entrance line 202, the avatar 203, and the maze end 204. The only element that has changed position since FIG. 2H and the first consumer page 235 is the avatar 203. By selecting the left arrow 236, the player 140 has moved the avatar 203 to the left along the top of the maze 201.

The second consumer page 239 again further comprises the left arrow 236, which, if the player 140 selects it, moves the avatar 203 to the left. The second consumer page 239 again further comprises the right arrow 237, which, if the player 140 selects it, moves the avatar 203 to the right. The second consumer page 239 again further comprises the jump button 238, which, if the player 140 selects it, causes the avatar 203 to jump upwards. The second consumer page 239 again further comprises the pause button 238A.

In FIG. 2J, after the second consumer page 239, using the external device screen 137, the external device 135 takes the player 140 to a third consumer page 240. The third consumer page 240 comprises a third screenshot 240 of the "Get the Goal" game in progress. The first consumer page 235 further comprises the maze 201, the entrance line 202, the avatar 203, and the maze end 204. The only element that has changed position since FIG. 2H and the first consumer page 235 is the avatar 203. By strategically selecting one or more of the left arrow 236, the right arrow 237, and the jump button 238, the player 140 has moved the avatar 203 to the middle of the maze 201, within sight of the maze end 204.

The third consumer page 240 again further comprises the left arrow 236, which, if the player 140 selects it, moves the avatar 203 to the left. The third consumer page 240 again further comprises the right arrow 237, which, if the player 140 selects it, moves the avatar 203 to the right. The third consumer page 240 further comprises the jump button 238, which, if the player 140 selects it, causes the avatar 203 to jump upwards. The third consumer page 240 again further comprises the pause button 238A.

In FIG. 2K, after the player 140 brings the avatar 203 to the maze end 204, using the external device screen 137, the external device 135 takes the player 140 to a first game completion page 241. The first game completion page 241 comprises a game completion legend 242. As depicted, the game completion legend 242 comprises the words, "Game Over. You Won! Game Name." The game completion page 241 further comprises a game completion options panel 243. The game completion options panel 243 comprises a home button 244 configured to send the player 140 to a home screen if the player 140 selects it, a report error button 245 configured to report an error from the player 140 to the system if the player 140 selects it, a replay button 246 configured to replay the same game if the player 140 selects it, a powerups button 247 configured to present the player 140 with different options to change the game if the player 140 selects it, a next button 248 configured to take the player 140 to the next game if the player 140 selects it, a retake picture button 249 configured to retake a photograph if the player 140 selects it, and a "share" button 250 configured to share the player 140's game results if the player 140 selects it. In this example, the player 140 selects the powerups button 247.

In FIG. 2L, after the player 140 selects the powerups button 247 in FIG. 2K, using the external device screen 137, the external device 135 takes the player 140 to a powerups page 251. The powerups page 251 comprises a popup consumer menu 252. The popup consumer menu 252 comprises a position button 253, a movement button 254, a hazard button 255, a skin button 256, an effects button 257, and a settings button 258. The position button 253 allows the player 140 to do one or more of select a position of a game element and change a position of a game element. The movement button 254 allows the player 140 to do one or more of select a movement of a game element and change a movement of a game element. The hazard button 255 allows the player 140 to do one or more of select a hazard and change a hazard. The skin button 256 allows the player 140 to change an appearance of a selected object. For example, the player 140 may select a gold skin that is configured to display a game object as a gold color. For example, instead of using a blue color for a goal, the gold color could be used. For example, instead of using a red color for a hazard, the gold color could be used. The option for the player 140 to use a skin to change a color associated with a class of objects is powerful for education purposes.

The effects button 257 allows the player 140 to do one or more of select an effect of the game and change an effect of the game. The powerups page 251 further comprises the maycel button 232. The settings button 258 allows the player 140 to do one or more of select a setting and change a setting, as shown in more detail in FIG. 2M.

The player 140 interested in doing one or more of selecting and changing a position of a game element hovers the cursor over the position button 253, thereby generating a popup position menu 259. The position menu 259 comprises a move button 260, a scale/rotate button 261, and a remove button 262. The player 140 uses the move button 260 to move the game element. The player 140 uses the scale/rotate button 261 to do one or more of scale the game element and move the game element. The player 140 uses the remove button 262 to remove the game element from the game.

In FIG. 2M, after the player 140 selects the settings button 258 in FIG. 2L, using the external device screen 137, the external device 135 takes the player 140 to a settings page 263. The settings page 263 comprises a popup settings menu 264. The settings menu 264 comprises a gravity checkbox 265. As depicted, the gravity checkbox 265 is a toggle switch. When the gravity checkbox 265 is checked, gravity operates in the game and items fall downward as with gravity on Earth in real life. When the gravity checkbox 265 is unchecked, there is no gravity and items and avatars in the game will "float" without falling as in outer space. Currently, as depicted, the gravity checkbox 265 is checked and gravity is operating in the game. The settings page 263 may further comprise button 232, the position button 253, the movement button 254, the hazard button 255, the skin button 256, the effects button 257, and the settings button 258.

In FIG. 2N, after the player 140 unchecks the gravity checkbox 265, gravity is no longer operating in the game and using the external device screen 137, the external device 135 takes the player 140 to an updated settings page 233. The settings page 263 again may comprises button 232, the position button 253, the movement button 254, the hazard button 255, the skin button 256, the effects button 257, and the settings button 258, the popup settings menu 264, and the gravity checkbox 265. Because the player 140 has unchecked the gravity checkbox 265, there is no gravity and items and avatars in the game will "float" without falling as in outer space.

In FIG. 2O, after the player 140 selects the maycel button 232 to leave the settings page 233 (depicted in FIG. 2N), using the external device screen 137, the external device 135 takes the player 140 to the modified game on a fourth consumer page 266. The fourth consumer page 266 comprises a first screenshot 266 of the revised "Get the Goal" game in progress. The fourth consumer page 266 again comprises the maze 201, the entrance line 202, the avatar 203, the maze end 204, the left arrow 236, the right arrow 237, and the pause button 238A.

When there is no gravity in the game, the configuration specifies the presence of one or more of an up arrow 267 and a down arrow 268 instead of the option when gravity is present of the avatar 203 jumping using a jump button 238 (as in FIG. 2J). When there is no gravity in the game, the configuration further specifies a "slower" button 269, which, when the player 140 selects it, causes the avatar 203 to move more slowly than previously. As depicted, the "slower" button 269 comprises a snail icon.

In FIG. 2P, after the fourth consumer page 266, using the external device screen 137, the external device 135 takes the player 140 to a fifth consumer page 270. The fifth consumer page 270 comprises a second screenshot 270 of the revised "Get the Goal" game in progress. The fifth consumer page 270 again comprises the maze 201, the entrance line 202, the avatar 203, the maze end 204, the left arrow 236, the right arrow 237, and the pause button 238A.

In FIG. 2P, the only element that has changed position since FIG. 2O and the fourth consumer page 266 is the avatar 203. By strategically selecting one or more of the left arrow 236 and the down arrow 268, the player 140 moves the avatar 203 to the left along the top of the maze 201.

In FIG. 2Q, after the fifth consumer page 270, using the external device screen 137, the external device 135 takes the player 140 to a sixth consumer page 271. The sixth consumer page 271 comprises a third screenshot 271 of the revised "Get the Goal" game in progress. The sixth consumer page 271 again comprises the maze 201, the entrance line 202, the avatar 203, the maze end 204, the left arrow 236, the right arrow 237, and the pause button 238A.

In FIG. 2Q, the only element that has changed position since FIG. 2P and the fifth consumer page 270 is the avatar 203. By strategically selecting one or more of the left arrow 236, the right arrow 237, the up arrow 267, and the down arrow 268, the player 140 has moved the avatar 203 to a position near a center of the maze 201.

In FIG. 2R, after the sixth consumer page 271, after the sixth consumer page 271, using the external device screen 137, the external device 135 takes the player 140 to a seventh consumer page 272. The seventh consumer page 272 comprises a fourth screenshot 272 of the revised "Get the Goal" game in progress. The seventh consumer page 272 again comprises the maze 201, the entrance line 202, the avatar 203, the maze end 204, the left arrow 236, the right arrow 237, and the pause button 238A.

In FIG. 2R, the only element that has changed position since FIG. 2Q and the sixth consumer page 271 is the avatar 203. By strategically selecting one or more of the left arrow 236 and the down arrow 268, the player 140 has moved the avatar 203 to a position near the maze end 204 of the maze 201.

FIG. 2S continues the illustrations of this example. After the player 140 brings the avatar 203 to the maze end 204, using the external device screen 137, the player 140 is taken to a second game completion page 273. The second game completion page 273 again comprises the game completion legend 242. As depicted, the game completion legend 242 again comprises the words, "Game Over. You Won! Game Name." The second game completion page 273 again further comprises the game completion options panel 243. The game completion options panel 243 again comprises the home button 244 configured to send the player 140 to a home screen if the player 140 selects it, the report error button 245 configured to report an error from the player 140 to the system if the player 140 selects it, the replay button 246 configured to replay the same game if the player 140 selects it, the powerups button 247 configured to present the player 140 with different options to change the game if the player 140 selects it, the next button 248 configured to take the player 140 to the next game if the player 140 selects it, the retake picture button 249 configured to retake a photograph if the player 140 selects it, and the "share" button 250 configured to share the player 140's game results if the player 140 selects it. In this example, the player 140 selects the home button 244.

The system receives the original printed maze 201 and processes it using a color identification algorithm configured to label regions according to their predominant color. For example, the system labels regions as one or more of red, green, blue, black, and purple.

FIG. 3 is a flow chart of a method 300 for codeless video game creation.

The order of the steps in the method 300 is not constrained to that shown in FIG. 3 or described in other flow diagrams and the following discussion herein. Several of the steps could occur in a different order without affecting the final result.

In step 310, a codeless video game creation server publishes to a developer configuration information specifying fundamental functionality available to the developer for codeless video game creation Block 310 then transfers control to block 320.

In step 320, the server receives from the developer input comprising the developer's configuration choices. Block 320 then transfers control to block 330.

In step 330, the server identifies object images of the input game image received from the user.

In step 340, the server consolidates the tools into a digital final product, a program of instructions that when executed provides and controls the game, and processes game inputs received in real time from the user for controlling the avatar or other game elements.

In step 350, consumer processor 94 provides to a player the playable game for play by the player. Flow controller 97 of game engine 91 may then terminate the process.

One or more components of the system may be provided as a web-based application on the Internet, in an application on an iPhone, in an application on an Android iPhone, and in another application. An advantage of embodiments of the invention is providing a system where the core functionality needs to be implemented only once and is then playable on a variety of devices. A yet additional advantage of embodiments of the invention is that the same uploaded developer data may be combined with different templates to achieve different results with minimal effort. According to an aspect of the invention, the input game image may be arbitrary and totally unknown to the system prior to its upload to the system by a user. A freeform drawing by a child may be uploaded and the system would identify game object images on the overall game image uploaded, map them to templates predefined, and generate a program of instructions that provides the video game playable by the user. The output image displayed as the digital board to the video game may be substantially identical to the input image. The output image may not be totally identical, in the sense that the output image is a digital two dimensional representation of the input game image, the output image may be sized to fit the user's monitor or screen, some smudges or other irrelevant minor elements may be cleaned up in the processing, and background white or grey of the input image may be homogenized, standardized, cleaned up or eliminated. Off-the-shelf illustration programs such as Photoshop may be used to extract data from the input game image.

It will be further understood by those of skill in the art that the number of variations of the method and device are virtually limitless. For example, instead of a goal comprising an item that the avatar must collect to win the game, the goal may instead be a destination to which the avatar must travel to win the game. For example, instead of a goal comprising an item that the avatar must collect to win the game, a set of goals is provided and the avatar must collect a subset of them to win the game. For example, the avatar must collect five of seven total goals to win the game.

For example, configuration may output one or more of buttons and grids and labels. For example, a browser may comprise the consumer, creating a game playable by the player using one or more of a web browser and a web application. For example, instead of uploading a two-dimensional game, the system may create a three-dimensional game using input from the developer. The game engine may output sounds, music snippets, and other audio during the playing of the game in response to various actions by the user in controlling an avatar or in response to other events.

It is intended that the subject matter in the above description shall be interpreted as illustrative and shall not be interpreted in a limiting sense. While the above representative embodiments have been described with certain components in exemplary configurations, it will be understood by one of ordinary skill in the art that other representative embodiments may be implemented using different configurations and/or different components. For example, it will be understood by one of ordinary skill in the art that the order of certain steps and certain components may be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form, order and details of the described embodiments resulting in equivalent embodiments that remain within the scope of the invention. Some components of the game engine 91 described herein may be substituted by one or more off-the-shelf components or components available elsewhere. It is intended, therefore, that the subject matter in the above description shall be interpreted as illustrative and shall not be interpreted in a limiting sense.

What is claimed is:

1. A method of creating a video game by a computer system based on a game image input by a user, the method comprising:
   receiving, by a user interface of the computer system, the game image, the game image previously unknown to the computer system and containing a plurality of object images previously unknown the computer system, the plurality of object images including an avatar, each object image corresponding to a game element of the video game, each game element associated with at least one property;
   associating automatically each object image with a respective game element that corresponds thereto by identifying automatically, in the game image, each object image;
   generating automatically a program of instructions executable by the computer system, the program of instructions defining positioning of game elements in the video game according to the at least one property associated with the game elements;
   executing the program of instructions to generate a display of a video game playable by the user, such that during the playing of the game, an output game image is displayed as a virtual game board with the object images moved on the output game image,
   wherein the output game image is substantially identical to the game image input by the user,
   wherein during a playing of the video game, the program of instructions causes each game element to be represented in the display by a respective object image of the plurality of object images.

2. The method of claim 1, wherein the method further comprises:
   prompting the user to enter a game configuration for the video game before the generating of the program of instructions,
   wherein the game configuration comprises a game object during a playing of the video game.

3. The method of claim 2, wherein the method further comprises:
   providing automatically, by the user interface, a plurality of predefined game configurations; and
   receiving, as the entry of the game configuration by the user, a selection of the user from among the predefined game configurations.

4. The method of claim 1, wherein the method further comprises:
   before the associating, receiving from the user, via the user interface, a customization of the at least one property; and
   the associating comprises associating the game element with the at least one customized property,
   wherein the program of instructions is generated according to the customized at least one property.

5. The method of claim 1, wherein at least one of the game elements comprises the avatar configured to be controlled by the user during the playing of the video game.

6. The method of claim 1, wherein at least one of game elements comprises an obstacle configured to be movable by the computer system during a playing of the video game in response to an input of the user during the playing of the video game that controls a first game element.

7. The method of claim 1, wherein a first object image of the plurality of object images comprises a color; and
   the associating comprises associating the first object image with a respective game element according to the color.

8. The method of claim 1, wherein the object image of the plurality of object images comprises a shape; and
   the associating comprises associating the first object image with a respective game element according to the shape.

9. The method of claim 1, wherein the at least one property of the game element comprises an attribute that controls a behavior of the game element during the playing of the video game.

10. The method of claim 1, wherein the method further comprises:
    receiving from the user a game configuration for the video game before the generating of the program of instructions,
    wherein the game configuration corresponds to a game objective during a playing of the video game, and the at least one property of the game element comprises an attribute that controls a behavior of the game element during a playing of the video game,
    wherein the behavior automatically controls the game element during the playing of the video game according to the game objective.

11. The method of claim 1, wherein the method comprises:
    controlling the positioning of a first game element of the plurality of game elements in the video game based on input received from the user during the playing of the video game,
    wherein the generating of the program of instructions comprises instruction defining a behavior during the playing of the video game of a second game element of the plurality of game elements, wherein the behavior is based on the positioning of the first game element.

12. The method of claim 1, wherein the method comprises:
    identifying a position of a color segment in the image; and
    the generating of the program of instructions comprises instructions positioning the game elements bound by the position identified,
    wherein during the playing of the video game the computer system causes display of the color segment at the position identified.

13. The method of claim 1, further comprising, before the receiving, reporting to the user the plurality of object images and the game elements they represent,
   wherein the game elements are stored by the computer system prior to the reporting.

14. The method of claim 1, further comprising:
   before the displaying of the output game image, performing image background processing on the game image input by the user.

15. The method of claim 1, wherein during the playing of the video game, a size of a first object image of the plurality of object images in relation to the size of the output game image is substantially unchanged in comparison with the size of the first object image in relation to the size of the game image input by the user.

16. The method of claim 1, wherein the game image input by the user is free of a grid.

17. A computer system comprising a video game engine configured to perform the method of claim 1.

* * * * *